(12) United States Patent
Smith et al.

(10) Patent No.: US 8,746,373 B2
(45) Date of Patent: Jun. 10, 2014

(54) METHODS OF ATTACHING A SHANK TO A BODY OF AN EARTH-BORING TOOL INCLUDING A LOAD-BEARING JOINT AND TOOLS FORMED BY SUCH METHODS

(75) Inventors: Redd H. Smith, The Woodlands, TX (US); James L. Duggan, Friendswood, TX (US); Anupam K. Singh, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 318 days.

(21) Appl. No.: 12/919,720

(22) PCT Filed: Jun. 3, 2009

(86) PCT No.: PCT/US2009/046092
§ 371 (c)(1),
(2), (4) Date: Feb. 11, 2011

(87) PCT Pub. No.: WO2009/149158
PCT Pub. Date: Dec. 10, 2009

(65) Prior Publication Data
US 2011/0186354 A1    Aug. 4, 2011

Related U.S. Application Data

(63) Continuation of application No. 12/133,288, filed on Jun. 4, 2008, now Pat. No. 7,703,556.

(51) Int. Cl.
*E21B 10/00*    (2006.01)
(52) U.S. Cl.
USPC .............................. 175/327; 175/425; 175/399

(58) Field of Classification Search
USPC .................... 175/327, 374, 425, 57, 428–431
See application file for complete search history.

(56) References Cited

U.S. PATENT DOCUMENTS

| 2,819,599 A | 1/1958 | Abkowitz et al. |
| 2,819,958 A | 1/1958 | Abkowitz et al. |

(Continued)

FOREIGN PATENT DOCUMENTS

| AU | 695583 | 2/1998 |
| CA | 2212197 | 10/2000 |

(Continued)

OTHER PUBLICATIONS

US 4,966,627, 10/1990, Keshavan et al., (withdrawn).

(Continued)

*Primary Examiner* — Yong-Suk (Philip) Ro
(74) *Attorney, Agent, or Firm* — TraskBritt

(57) ABSTRACT

Earth-boring rotary drill bits may include a bit body attached to a shank assembly at a joint. The joint may be configured to carry at least a portion of any tensile longitudinal and rotational load applied to the drill bit by mechanical interference at the joint. The joint may be configured to carry a selected portion of any tensile longitudinal load applied to the drill bit. Methods for attaching a shank assembly to a bit body of an earth-boring rotary drill bit include configuring a joint to carry at least a portion of any tensile longitudinal and rotational load applied to the drill bit by mechanical interference. The joint may be configured to carry a selected portion of any tensile longitudinal load applied to the drill bit by mechanical interference.

11 Claims, 16 Drawing Sheets

(56) References Cited

U.S. PATENT DOCUMENTS

| | | | |
|---|---|---|---|
| 2,906,654 A | 9/1959 | Abkowitz | |
| 3,368,881 A | 2/1968 | Abkowitz et al. | |
| 3,660,050 A | 5/1972 | Iler et al. | |
| 3,757,879 A | 9/1973 | Wilder et al. | |
| 3,987,859 A | 10/1976 | Lichte | |
| 4,017,480 A | 4/1977 | Baum | |
| 4,047,828 A | 9/1977 | Makely | |
| 4,094,709 A | 6/1978 | Rozmus | |
| 4,128,136 A | 12/1978 | Generoux | |
| 4,198,233 A | 4/1980 | Frehn | |
| 4,221,270 A | 9/1980 | Vezirian | |
| 4,229,638 A | 10/1980 | Lichte | |
| 4,233,720 A | 11/1980 | Rozmus | |
| 4,255,165 A | 3/1981 | Dennis et al. | |
| 4,306,139 A | 12/1981 | Shinozaki et al. | |
| 4,341,557 A | 7/1982 | Lizenby | |
| 4,389,952 A | 6/1983 | Dreier et al. | |
| 4,499,048 A | 2/1985 | Hanejko | |
| 4,499,795 A | 2/1985 | Radtke | |
| 4,526,748 A | 7/1985 | Rozmus | |
| 4,547,337 A | 10/1985 | Rozmus | |
| 4,552,232 A | 11/1985 | Frear | |
| 4,554,130 A | 11/1985 | Ecer | |
| 4,562,990 A | 1/1986 | Rose | |
| 4,596,694 A | 6/1986 | Rozmus | |
| 4,597,730 A | 7/1986 | Rozmus | |
| 4,630,693 A | 12/1986 | Goodfellow | |
| 4,656,002 A | 4/1987 | Lizenby et al. | |
| 4,667,756 A | 5/1987 | King et al. | |
| 4,686,080 A | 8/1987 | Hara et al. | |
| 4,694,919 A | 9/1987 | Barr | |
| 4,743,515 A | 5/1988 | Fischer et al. | |
| 4,744,943 A | 5/1988 | Timm | |
| 4,809,903 A | 3/1989 | Eylon et al. | |
| 4,838,366 A | 6/1989 | Jones | |
| 4,871,377 A | 10/1989 | Frushour | |
| 4,919,013 A | 4/1990 | Smith et al. | |
| 4,919,221 A | 4/1990 | Pascale | |
| 4,923,512 A | 5/1990 | Timm et al. | |
| 4,956,012 A | 9/1990 | Jacobs et al. | |
| 4,968,348 A | 11/1990 | Abkowitz et al. | |
| 5,000,273 A | 3/1991 | Horton et al. | |
| 5,030,598 A | 7/1991 | Hsieh | |
| 5,032,352 A | 7/1991 | Meeks et al. | |
| 5,049,450 A | 9/1991 | Dorfman et al. | |
| 5,161,898 A | 11/1992 | Drake | |
| 5,232,522 A | 8/1993 | Doktycz et al. | |
| 5,281,260 A | 1/1994 | Kumar et al. | |
| 5,286,685 A | 2/1994 | Schoennahl et al. | |
| 5,348,806 A | 9/1994 | Kojo et al. | |
| 5,443,337 A | 8/1995 | Katayama | |
| 5,482,670 A | 1/1996 | Hong | |
| 5,484,468 A | 1/1996 | Ostlund et al. | |
| 5,506,055 A | 4/1996 | Dorfman et al. | |
| 5,543,235 A | 8/1996 | Mirchandani et al. | |
| 5,560,440 A | 10/1996 | Tibbitts | |
| 5,593,474 A | 1/1997 | Keshavan et al. | |
| 5,611,251 A | 3/1997 | Katayama | |
| 5,612,264 A | 3/1997 | Nilsson et al. | |
| 5,641,251 A | 6/1997 | Leins | |
| 5,641,921 A | 6/1997 | Dennis et al. | |
| 5,662,183 A | 9/1997 | Fang | |
| 5,666,864 A | 9/1997 | Tibbitts | |
| 5,677,042 A | 10/1997 | Massa et al. | |
| 5,679,445 A | 10/1997 | Massa et al. | |
| 5,697,046 A | 12/1997 | Conley | |
| 5,732,783 A | 3/1998 | Truax et al. | |
| 5,733,649 A | 3/1998 | Kelley et al. | |
| 5,733,664 A | 3/1998 | Kelley et al. | |
| 5,753,160 A | 5/1998 | Takeuchi et al. | |
| 5,765,095 A | 6/1998 | Flak et al. | |
| 5,776,593 A | 7/1998 | Massa et al. | |
| 5,778,301 A | 7/1998 | Hong | |
| 5,789,686 A | 8/1998 | Massa et al. | |
| 5,792,403 A | 8/1998 | Massa et al. | |
| 5,806,934 A | 9/1998 | Massa et al. | |
| 5,830,256 A | 11/1998 | Northrop et al. | |
| 5,856,626 A | 1/1999 | Fischer et al. | |
| 5,865,571 A | 2/1999 | Tankala et al. | |
| 5,880,382 A | 3/1999 | Fang et al. | |
| 5,897,830 A | 4/1999 | Abkowitz et al. | |
| 5,957,006 A | 9/1999 | Smith | |
| 5,963,775 A | 10/1999 | Fang | |
| 6,029,544 A | 2/2000 | Katayama | |
| 6,051,171 A | 4/2000 | Takeuchi et al. | |
| 6,063,333 A | 5/2000 | Dennis | |
| 6,086,980 A | 7/2000 | Foster et al. | |
| 6,089,123 A | 7/2000 | Chow et al. | |
| 6,148,936 A | 11/2000 | Evans et al. | |
| 6,200,514 B1 | 3/2001 | Meister | |
| 6,209,420 B1 | 4/2001 | Butcher et al. | |
| 6,214,134 B1 | 4/2001 | Eylon et al. | |
| 6,214,287 B1 | 4/2001 | Waldenstrom | |
| 6,220,117 B1 | 4/2001 | Butcher | |
| 6,227,188 B1 | 5/2001 | Tankala et al. | |
| 6,228,139 B1 | 5/2001 | Oskarsson | |
| 6,241,036 B1 | 6/2001 | Lovato et al. | |
| 6,254,658 B1 | 7/2001 | Taniuchi et al. | |
| 6,287,360 B1 | 9/2001 | Kembaiyan et al. | |
| 6,290,438 B1 | 9/2001 | Papajewski | |
| 6,293,986 B1 | 9/2001 | Rodiger et al. | |
| 6,325,163 B2 | 12/2001 | Tibbitts | |
| 6,375,706 B2 | 4/2002 | Kembaiyan et al. | |
| 6,453,899 B1 | 9/2002 | Tselesin | |
| 6,454,025 B1 | 9/2002 | Runquist et al. | |
| 6,454,030 B1 | 9/2002 | Findley et al. | |
| 6,458,471 B2 | 10/2002 | Lovato et al. | |
| 6,500,226 B1 | 12/2002 | Dennis | |
| 6,511,265 B1 | 1/2003 | Mirchandani et al. | |
| 6,576,182 B1 | 6/2003 | Ravagni et al. | |
| 6,589,640 B2 | 7/2003 | Griffin et al. | |
| 6,599,467 B1 | 7/2003 | Yamaguchi et al. | |
| 6,607,693 B1 | 8/2003 | Saito et al. | |
| 6,655,481 B2 | 12/2003 | Findley et al. | |
| 6,685,880 B2 | 2/2004 | Engstrom et al. | |
| 6,742,608 B2 | 6/2004 | Murdoch | |
| 6,742,611 B1 | 6/2004 | Illerhaus et al. | |
| 6,756,009 B2 | 6/2004 | Sim et al. | |
| 6,849,231 B2 | 2/2005 | Kojima et al. | |
| 6,918,942 B2 | 7/2005 | Hatta et al. | |
| 7,044,243 B2 | 5/2006 | Kembaiyan et al. | |
| 7,048,081 B2 | 5/2006 | Smith et al. | |
| 7,703,556 B2 | 4/2010 | Smith et al. | |
| 2003/0010409 A1 | 1/2003 | Kunze et al. | |
| 2004/0013558 A1 | 1/2004 | Kondoh et al. | |
| 2004/0060742 A1 | 4/2004 | Kembaiyan et al. | |
| 2004/0243241 A1 | 12/2004 | Istephanous et al. | |
| 2004/0245024 A1 | 12/2004 | Kembaiyan | |
| 2005/0072496 A1 | 4/2005 | Hwang et al. | |
| 2005/0117984 A1 | 6/2005 | Eason et al. | |
| 2005/0126334 A1 | 6/2005 | Mirchandani | |
| 2005/0211475 A1 | 9/2005 | Mirchandani et al. | |
| 2005/0247491 A1 | 11/2005 | Mirchandani et al. | |
| 2005/0268746 A1 | 12/2005 | Abkowitz et al. | |
| 2006/0016521 A1 | 1/2006 | Hanusiak et al. | |
| 2006/0043648 A1 | 3/2006 | Takeuchi et al. | |
| 2006/0057017 A1 | 3/2006 | Woodfield et al. | |
| 2006/0131081 A1 | 6/2006 | Mirchandani et al. | |
| 2006/0278433 A1 | 12/2006 | Walker et al. | |
| 2007/0042217 A1 | 2/2007 | Fang et al. | |
| 2007/0102198 A1 | 5/2007 | Oxford et al. | |
| 2007/0102199 A1 | 5/2007 | Smith et al. | |
| 2007/0102200 A1 | 5/2007 | Choe et al. | |
| 2007/0102202 A1* | 5/2007 | Choe et al. ............ 175/425 |
| 2008/0135304 A1 | 6/2008 | Duggan et al. | |

FOREIGN PATENT DOCUMENTS

| | | |
|---|---|---|
| EP | 0453428 A1 | 10/1991 |
| EP | 0995876 A2 | 4/2000 |
| EP | 1244531 B1 | 10/2002 |
| GB | 945227 | 12/1963 |
| GB | 2203774 A | 10/1988 |
| GB | 2385350 A | 8/2003 |

(56) References Cited

FOREIGN PATENT DOCUMENTS

| GB | 2393449 A | 3/2004 |
|---|---|---|
| JP | 10219385 A | 8/1998 |
| SU | 1773663 A1 | 11/1992 |
| WO | 03049889 A2 | 6/2003 |
| WO | 2004053197 A2 | 6/2004 |

OTHER PUBLICATIONS

Alman, D.E., et al., "The Abrasive Wear of Sintered Titanium Matrix-Ceramic Particle Reinforced Composites," WEAR, 225-229 (1999), pp. 629-639.

Boron Carbide Nozzles and Inserts, Seven Stars International webpage http://www.concentric.net/~ctkang/nozzle.shtml, printed Sep. 7, 2006.

Choe, Heeman, et al., "Effect of Tungsten Additions on the Mechanical Properties of Ti-6A1-4V," Material Science and Engineering, A 396 (2005), pp. 99-106, Elsevier.

Diamond Innovations, "Composite Diamond Coatings, Superhard Protection of Wear Parts New Coating and Service Parts from Diamond Innovations" brochure, 2004.

Gale, W.F., et al., Smithells Metals Reference Book, Eighth Edition, 2003, p. 2117, Elsevier Butterworth Heinemann.

Key to Metals website article, "Heat Treating of Titanium and Titanium Alloys," www.key-to-metals.com, printed Sep. 21, 2006.

PCT International Search Report and Written Opinion of the International Search Authority for PCT Counterpart Application No. PCT/US2006/043670, mailed Apr. 2, 2007.

PCT International Search Report for counterpart PCT International Application No. PCT/US2007/023275, mailed Apr. 11, 2008.

Reed, James S., "Chapter 13: Particle Packing Characteristics," Principles of Ceramics Processing, Second Edition, John Wiley & Sons, Inc. (1995), pp. 215-227.

U.S. Appl. No. 60/566,063, filed Apr. 28, 2004, entitled "Body Materials for Earth Boring Bits" to Mirchandani et al.

Warrier, S.G., et al., "Infiltration of Titanium Alloy-Matrix Composites," Journal of Materials Science Letters, 12 (1993), pp. 865-868, Chapman & Hall.

Miserez, A., et al. "Particle Reinforced Metals of High Ceramic Content," Material Science and Engineering A 387-389 (2004), pp. 822-831, Elsevier.

International Search Report for International Application No. PCT/US2009/046092 dated Jan. 21, 2010, 7 pages.

International Written Opinion for International Application No. PCT/US2009/046092 dated Jan. 21, 2010, 5 pages.

Russian Office Action for Russian Application No. 2010 154 496 dated May 16, 2013, 4 pages.

\* cited by examiner

METHODS OF ATTACHING A SHANK TO A BODY OF AN EARTH-BORING TOOL INCLUDING A LOAD-BEARING JOINT AND TOOLS FORMED BY SUCH METHODS

CROSS-REFERENCE TO RELATED APPLICATIONS

This is a national phase entry under 35 U.S.C. §371 of International Patent Application PCT/US2009/046092, filed Jun. 3, 2009, which claims the benefit under Article 8 of the Patent Cooperation Treaty to U.S. patent application Ser. No. 12/133,288, filed Jun. 4, 2008, now U.S. Pat. No. 7,703,556, issued Apr. 27, 2010, the entire disclosure of each of which is hereby incorporated herein by this reference.

TECHNICAL FIELD

The present invention generally relates to earth-boring drill bits and other tools that may be used to drill subterranean formations and to methods of manufacturing such drill bits and tools. More particularly, the present invention relates to methods for attaching a shank to a body of a drill bit or other tool for earth boring that includes a shank attached to a body and to resulting drill bits and tools.

BACKGROUND

Rotary drill bits are commonly used for drilling bore holes or wells in earth formations. One type of rotary drill bit is the fixed-cutter bit (often referred to as a "drag" bit), which typically includes a plurality of cutting elements secured to a face region of a bit body. The bit body of a rotary drill bit may be formed from steel. Alternatively, the bit body may be formed from a conventional particle-matrix composite material 15. A conventional earth-boring rotary drill bit 10 is shown in FIG. 1 that includes a bit body 12 comprising a particle-matrix composite material 15. The bit body 12 is secured to a steel shank 20 having a threaded connection portion 28 (e.g., an American Petroleum Institute (API) threaded connection portion) for attaching the drill bit 10 to a drill string (not shown). The bit body 12 includes a crown 14 and a steel blank 16. The steel blank 16 is partially embedded in the crown 14. The crown 14 includes a particle-matrix composite material 15, such as, for example, particles of tungsten carbide embedded in a copper alloy matrix material. The bit body 12 is secured to the steel shank 20 by way of a threaded connection 22 and a weld 24 extending around the drill bit 10 on an exterior surface thereof along an interface between the bit body 12 and the steel shank 20.

The bit body 12 further includes wings or blades 30 that are separated by junk slots 32. Internal fluid passageways (not shown) extend between a face 18 of the bit body 12 and a longitudinal bore 40, which extends through the steel shank 20 and partially through the bit body 12. Nozzle inserts (not shown) also may be provided at the face 18 of the bit body 12 within the internal fluid passageways.

A plurality of cutting elements 34 is attached to the face 18 of the bit body 12. Generally, the cutting elements 34 of a fixed-cutter type drill bit have either a disk shape or a substantially cylindrical shape. A cutting surface 35 comprising a hard, super-abrasive material, such as mutually bound particles of polycrystalline diamond, may be provided on a substantially circular end surface of each cutting element 34. Such cutting elements 34 are often referred to as "polycrystalline diamond compact" (PDC) cutting elements 34. The PDC cutting elements 34 may be provided along the blades 30 within pockets 36 formed in the face 18 of the bit body 12, and may be supported from behind by buttresses 38, which may be integrally formed with the crown 14 of the bit body 12. Typically, the cutting elements 34 are fabricated separately from the bit body 12 and secured within the pockets 36 formed in the outer surface of the bit body 12. A bonding material such as an adhesive or, more typically, a braze alloy may be used to secure the cutting elements 34 to the bit body 12.

During drilling operations, the drill bit 10 is secured to the end of a drill string, which includes tubular pipe and equipment segments coupled end to end between the drill bit 10 and other drilling equipment at the surface. The drill bit 10 is positioned at the bottom of a well bore hole such that the cutting elements 34 are adjacent the earth formation to be drilled. Equipment such as a rotary table or top drive may be used for rotating the drill string and the drill bit 10 within the bore hole. Alternatively, the shank 20 of the drill bit 10 may be coupled directly to the drive shaft of a down-hole motor, which then may be used to rotate the drill bit 10. As the drill bit 10 is rotated, drilling fluid is pumped to the face 18 of the bit body 12 through the longitudinal bore 40 and the internal fluid passageways (not shown). Rotation of the drill bit 10 under weight applied through the drill string causes the cutting elements 34 to scrape across and shear away the surface of the underlying formation. The formation cuttings mix with and are suspended within the drilling fluid and pass through the junk slots 32 and the annular space between the well bore hole and the drill string to the surface of the earth formation.

Conventionally, bit bodies that include a particle-matrix composite material 15, such as the previously described bit body 12, have been fabricated in graphite molds using a so-called "infiltration" process. The cavities of the graphite molds are conventionally machined with a multi-axis machine tool. Fine features are then added to the cavity of the graphite mold using hand-held tools. Additional clay work also may be required to obtain the desired configuration of some features of the bit body. Where necessary, preform elements or displacements (which may comprise ceramic components, graphite components, or resin-coated sand compact components) may be positioned within the mold and used to define the internal passages, cutting element pockets 36, junk slots 32, and other external topographic features of the bit body 12. The cavity of the graphite mold is filled with hard particulate carbide material (such as tungsten carbide, titanium carbide, tantalum carbide, etc.). The preformed steel blank 16 may then be positioned in the mold at the appropriate location and orientation. The steel blank 16 typically is at least partially submerged in the particulate carbide material within the mold.

The mold then may be vibrated or the particles otherwise packed to decrease the amount of space between adjacent particles of the particulate carbide material. A matrix material (often referred to as a "binder" material), such as a copper-based alloy, may be melted, and caused or allowed to infiltrate the particulate carbide material within the mold cavity. The mold and bit body 12 are allowed to cool to solidify the matrix material. The steel blank 16 is bonded to the particle-matrix composite material 15 forming the crown 14 upon cooling of the bit body 12 and solidification of the matrix material. Once the bit body 12 has cooled, the bit body 12 is removed from the mold and any displacements are removed from the bit body 12. Destruction of the graphite mold typically is required to remove the bit body 12 therefrom.

The PDC cutting elements 34 may be bonded to the face 18 of the bit body 12 after the bit body 12 has been cast by, for example, brazing, mechanical, or adhesive affixation. Alternatively, the cutting elements 34 may be bonded to the face 18 of the bit body 12 during furnacing of the bit body if thermally stable synthetic or natural diamonds are employed in the cutting elements 34.

After the bit body 12 has been formed, the bit body 12 may be secured to the steel shank 20. As the particle-matrix composite materials 15 typically used to form the crown 14 are relatively hard and not easily machined, the steel blank 16 is used to secure the bit body 12 to the shank 20. Complementary threads may be machined on exposed surfaces of the steel blank 16 and the shank 20 to provide the threaded connection 22 therebetween. The steel shank 20 may be threaded onto the bit body 12, and the weld 24 then may be provided along the interface between the bit body 12 and the steel shank 20.

BRIEF SUMMARY OF THE INVENTION

In one embodiment, the present invention includes an earth-boring rotary drill bit having a bit body attached to a shank assembly at a joint. The joint may be configured to carry at least a portion of any tensile longitudinal load applied to the earth-boring rotary drill bit and at least a portion of any rotational load applied to the earth-boring rotary drill bit by mechanical interference between the bit body and the shank assembly at the joint.

In another embodiment, the present invention includes an earth-boring rotary drill having a connection portion attached to a shank assembly at a joint. The joint may be configured to carry a selected portion of any tensile longitudinal load applied to the drill bit by mechanical interference between abutting surfaces of the connection portion and the shank assembly at the joint.

In yet another embodiment, the present invention includes a method of attaching a shank assembly to a bit body of an earth-boring rotary drill bit by abutting at least one surface of the shank assembly against at least one surface of the bit body to form a joint and configuring the joint to carry at least a portion of any tensile longitudinal load applied to the drill bit and at least a portion of any rotational load applied to the drill bit by mechanical interference between the bit body and the shank assembly at the joint.

In yet an additional embodiment, the present invention includes a method of attaching a shank assembly to a bit body of an earth-boring rotary drill bit by abutting at least one surface of the bit body against at least one surface of a shank assembly to form a joint and configuring the joint to carry a selected portion of any tensile longitudinal load applied to the drill bit by mechanical interference between the abutting surfaces of the bit body and the shank assembly.

BRIEF DESCRIPTION OF THE DRAWINGS

While the specification concludes with claims particularly pointing out and distinctly claiming that which is regarded as the present invention, the advantages of this invention may be more readily ascertained from the following description of the invention when read in conjunction with the accompanying drawings in which:

DETAILED DESCRIPTION OF THE INVENTION

The illustrations presented herein are not meant to be actual views of any particular material, apparatus, system, or method, but are merely idealized representations which are employed to describe the present invention. Additionally, elements common between figures may retain the same numerical designation. Furthermore, embodiments of the present invention include, without limitation, core bits, bi-center bits, eccentric bits, so-called "reamer wings" as well as drilling and other downhole tools that may employ a body having a shank secured thereto in accordance with the present invention. Therefore, as used herein, the terms "earth-boring drill bit" and "drill bit" encompass all such structures.

As previously discussed, it can be difficult to secure a metal shank, such as the previously described shank 20 (FIG. 1), to a bit body formed from a relatively hard and abrasive material. Furthermore, conventional joints formed to secure a metal shank to a bit body may fail during drilling operations. Specifically, a joint securing a bit body to a metal shank may fail due to both a torque applied to the shank by a drill string or a drive shaft of a downhole motor during a drilling operation and longitudinal forces applied to the shank by a drill string during a drilling operation. Such longitudinal forces may include, for example, compressive forces applied to the shank during drilling and tensile forces applied to the shank while back reaming or tripping the drill bit from the wellbore. If a bit body becomes detached from a shank or drill string during drilling operations it can be difficult, time consuming, and expensive to remove the bit body from the bore hole.

In view of the above, the inventors of the present invention have developed methods for attaching a bit body to a shank assembly of an earth-boring rotary drill bit. Such methods and earth-boring rotary drill bits formed using such methods are described below with reference to FIGS. 2-18. Such methods include forming joints between a bit body and a shank assembly that exhibit mechanical interference between the bit body and the shank for bearing at least a portion of the longitudinal and/or torsional loads applied to the joint. Additionally, such methods may include selectively apportioning any longitudinal loads applied to a shank assembly to the mechanical interference between the bit body and the shank assembly.

Figure 1:
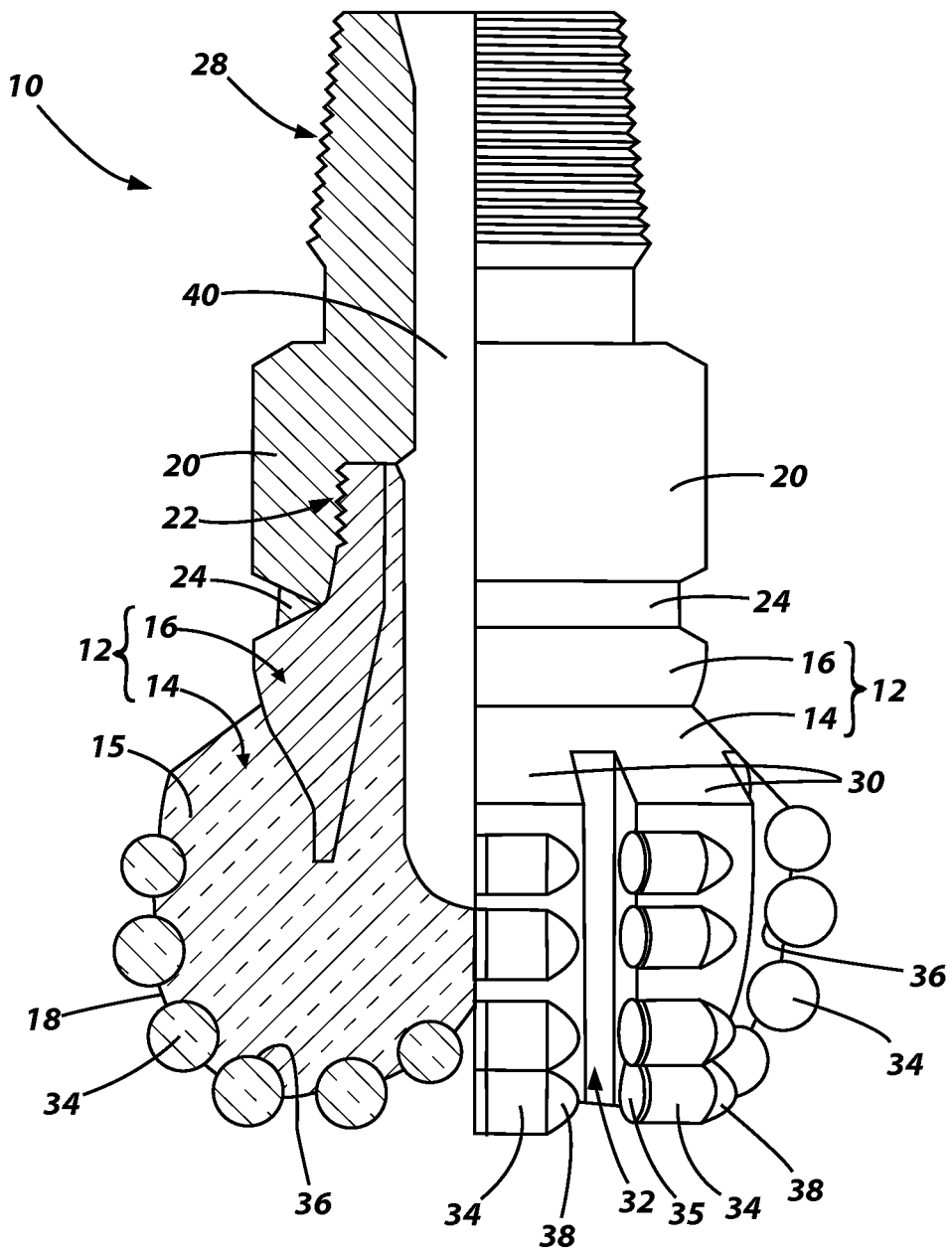
FIG. 1 is a partial longitudinal cross-sectional view of a conventional earth-boring rotary drill bit that has a bit body that includes a particle-matrix composite material.
Figure 2:
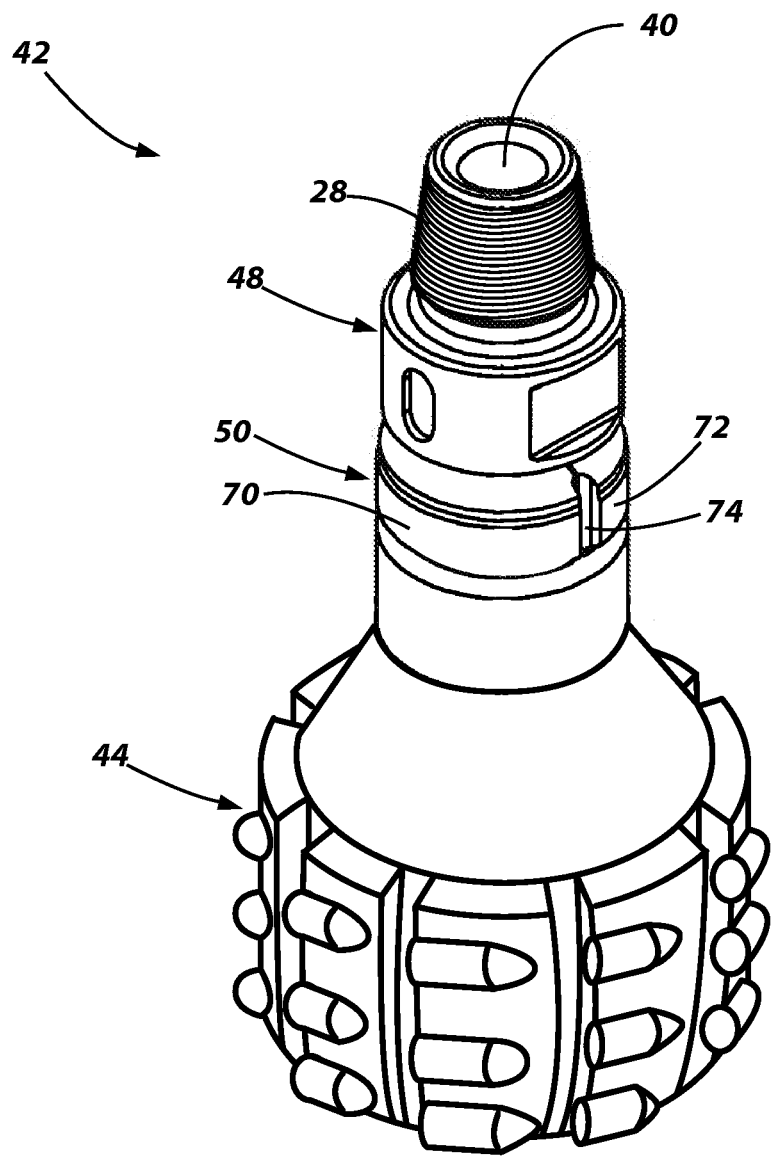
FIG. 2 is a perspective view of one embodiment of an earth-boring rotary drill bit of the present invention that includes a shank assembly attached directly to a portion of a bit body of the drill bit using a load-bearing joint.
Figure 3:
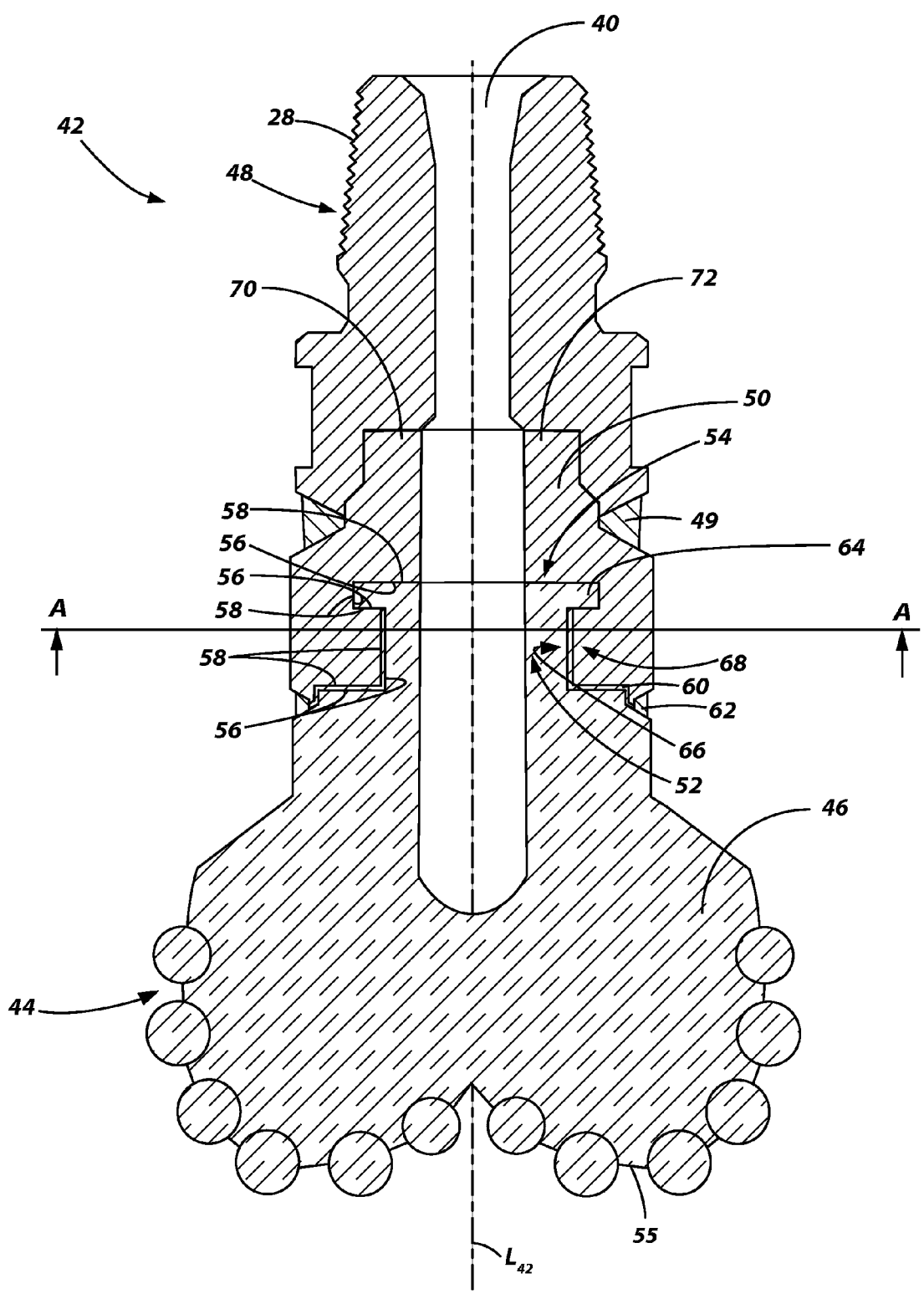
FIG. 3 is a longitudinal cross-sectional view of the earth-boring rotary drill bit shown in FIG. 2.

An embodiment of an earth-boring rotary drill bit 42 of the present invention is shown in a perspective view in FIG. 2, and in a longitudinal cross-sectional view in FIG. 3. As shown in FIG. 3, the earth-boring rotary drill bit 42 may not include a metal blank, such as the steel blank 16 of the drill bit 10 (FIG. 1). In contrast, a shank assembly, which includes a shank 48 secured to an extension 50, may be secured directly to the particle-matrix composite material 46 of a bit body 44. As used herein, the term "shank assembly" means any structure or assembly that is or may be attached directly to a bit body of an earth-boring rotary drill bit that includes a threaded connection configured for coupling the structure or assembly, and the bit body attached thereto, to a drill string. Shank assemblies include, for example, a shank secured to an extension member, such as the shank 48 and the extension 50 of the earth-boring rotary drill bit 42, as well as a shank that is used without an extension member, as described below in reference to the earth-boring rotary drill bit 300 shown in FIG. 18.

As shown in FIG. 3, the shank 48 may include a connection portion 28 (e.g., an American Petroleum Institute (API) threaded connection portion) and may be at least partially secured to the extension 50 by a weld 49 extending at least partially around the drill bit 42 on an exterior surface thereof along an interface between the shank 48 and the extension 50. By way of example and not limitation, both the shank 48 and the extension 50 may each be formed from steel, another iron-based alloy, or any other material that exhibits acceptable physical properties.

In some embodiments, the bit body 44 may comprise a particle-matrix composite material 46. By way of example and not limitation, the particle-matrix composite material 46 may comprise a plurality of hard particles dispersed throughout a matrix material. In some embodiments, the hard particles may comprise a material selected from diamond, boron carbide, boron nitride, aluminum nitride, and carbides or borides of the group consisting of W, Ti, Mo, Nb, V, Hf, Zr, Si, Ta, and Cr, and the matrix material may be selected from the group consisting of iron-based alloys, nickel-based alloys, cobalt-based alloys, titanium-based alloys, aluminum-based alloys, iron and nickel-based alloys, iron and cobalt-based alloys, and nickel and cobalt-based alloys. As used herein, the term "[metal]-based alloy" (where [metal] is any metal) means commercially pure [metal] in addition to metal alloys wherein the weight percentage of [metal] in the alloy is greater than or equal to the weight percentage of all other components of the alloy individually.

In some embodiments, the bit body 44 may include a plurality of blades separated by junk slots (similar to the blades 30 and the junk slots 32 shown in FIG. 1). A plurality of cutting elements (similar to the cutting elements 34 shown in FIG. 1, which may include, for example, PDC cutting elements) may be mounted on a face 55 of the bit body 44 along each of the blades.

One or more surfaces 56 of the bit body 44 may be configured to abut against one or more complementary surfaces 58 of the extension 50. In some embodiments, a braze alloy 60 or other adhesive material may be provided between the abutting surfaces 56, 58 of the bit body 44 and the extension 50 to at least partially secure the bit body 44 to the extension 50, as shown in FIG. 3. In addition to the braze alloy 60, a weld 62 extending around at least a portion of the drill bit 42 on an exterior surface thereof along an interface between the bit body 44 and the extension 50 may additionally be used to at least partially secure the extension 50 to the bit body 44. In additional embodiments, there may be no braze alloy 60 or other adhesive material between the abutting surfaces 56, 58. In yet additional embodiments, as shown in FIG. 3, a braze alloy 60 or other adhesive material may be provided along a portion of the interface of the abutting surfaces 56, 58 and along another portion of the interface the surfaces 56, 58 may directly abut against each other.

For purposes of illustration, the thickness of the braze alloy 60 shown in FIGS. 3-18 has been exaggerated. In actuality, the surfaces 56, 58 on opposite sides of the braze alloy 60 may abut one another over substantially the entire area between the surfaces 56, 58, as described herein, and any braze alloy 60 provided between the surfaces 56, 58 may be substantially disposed in the relatively small gaps or spaces between the opposing surfaces that arise due to surface roughness or imperfections in or on the opposing surfaces. It is also contemplated that surface features, such as lands, may be provided on one or both of the opposing and abutting surfaces for defining a gap or standoff having a predefined thickness of less than approximately 500 microns (approximately 0.02 inches) between the opposing and abutting surfaces. As used herein, the term "abutting surfaces" includes opposing surfaces that abut one another over an area between the surfaces, as well as opposing surfaces that abut one another at least primarily at surface features that provide a selected standoff or gap between the surfaces for receiving a braze alloy 60 or other adhesive material therebetween.

As shown in FIG. 3, the abutting surfaces 56, 58 may not include threads. However, in other embodiments, at least a portion of the abutting surfaces 56, 58 may include threads (not shown).

Figure 4:
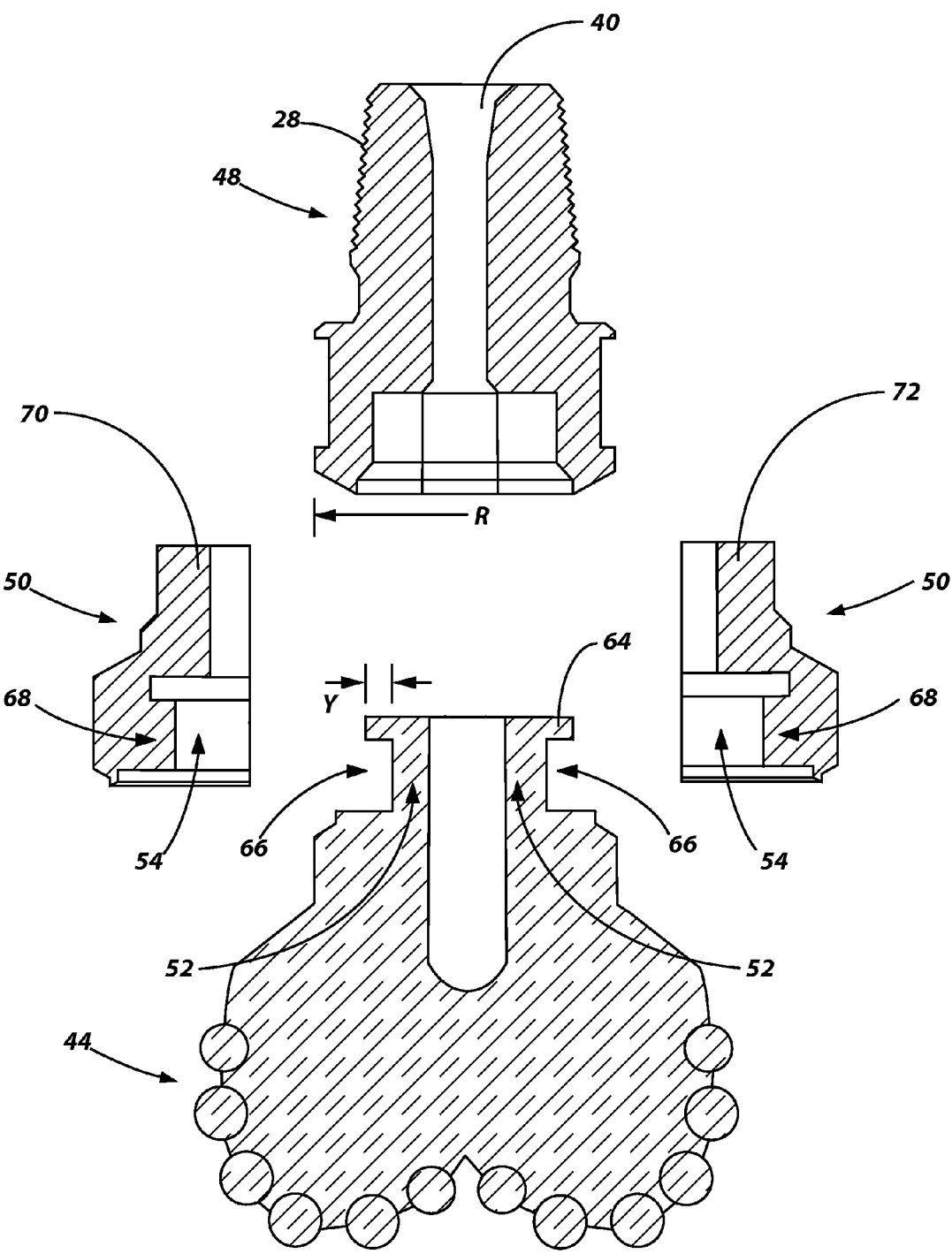
FIG. 4 is an exploded longitudinal cross-sectional view of the earth-boring rotary drill bit shown in FIG. 2.

FIG. 4 is an exploded longitudinal cross-sectional view of the earth-boring rotary drill bit 42 shown in FIGS. 2 and 3. As shown in FIGS. 3 and 4, in some embodiments, the bit body 44 may comprise a male connection portion 52, and the extension 50 may comprise a female connection portion 54 having a complementary size and shape to the male connection portion 52. For example, one or more of the surfaces 56 of the bit body 44 may define the male connection portion 52 and one or more of the surfaces 58 of the extension 50 may define the female connection portion 54.

The female connection portion 54 of the extension 50 is configured to receive the male connection portion 52 of the bit body 44 therein to form a joint between the extension 50 and the bit body 44. As discussed in further detail below, this joint between the extension 50 and the bit body 44 may be configured such that mechanical interference between the extension 50 and the bit body 44 at the joint carries at least a portion of any longitudinal load applied thereto during drilling operations. In particular, the joint may comprise a threadless joint configured to carry at least a portion of any tensile longitudinal load applied thereto, such as, for example, during back reaming or tripping the drill bit. The threadless joint may also be configured to carry at least a portion of any rotational load (i.e., torque) applied thereto during drilling operations, as described hereinabove. As used herein, the term "threadless joint" means any joint between members that is free of cooperating threads on the members that engage one another at the joint as the members are aligned and rotated relative to one another.

For example, the joint between the extension 50 and the bit body 44 may comprise an interlocking channel 66 and protrusion 68, which may be disposed in a plane oriented transverse to the longitudinal axis $L_{42}$ of the drill bit 42. The interlocking channel 66 and protrusion 68 may extend at least partially around (e.g., entirely around) the longitudinal axis $L_{42}$ of the drill bit 42. In the embodiment shown in the figures, the surfaces 56 of the bit body 44 may comprise or define the channel 66, which extends into the male connection portion 52 in a direction extending generally radially inward toward the longitudinal axis $L_{42}$, and the surfaces 58 of the extension 50 may comprise or define the protrusion 68, which is disposed within the channel 66. The protrusion 68 may be configured to have a complementary size and shape to the channel 66, and the protrusion 68 and the channel 66 may be configured to longitudinally interlock with each other. In other words, the protrusion 68 may extend radially toward the longitudinally axis $L_{42}$ and into the radially recessed channel 66 so that at least a portion of the protrusion 68 is positioned longitudinally beneath a flange 64 on the male connection portion 52 of the bit body 44, as shown in FIG. 4. In some embodiments, at least a portion of interlocking channel 66 and protrusion 68 may have an annular shape that is generally circular or a generally oval (in a plane that is oriented transverse to the longitudinal axis $L_{42}$ of the drill bit 42). In additional embodiments, not shown, the surfaces of the bit body 44 may comprise or define the protrusion and the surfaces of the extension 50 may comprise or define the channel.

As the joint between the extension 50 and the bit body 44 may be configured to carry a portion of any longitudinal load applied to the earth-boring rotary drill bit 42 during drilling operations, the channel 66 and protrusion 68 each may be configured to include abutting surface areas large enough to carry a substantial portion of any longitudinal load applied to the earth-boring rotary drill bit 42. By way of example and not limitation, the channel 66 may be configured to extend radially into the male connection portion 52 of the bit body 44 towards the longitudinal axis $L_{42}$ a distance Y that is at least approximately five percent (5%) of the radius R of the shank 48, as shown in FIG. 4. In some embodiments, the channel 66 may extend radially toward the longitudinal axis $L_{42}$ a distance Y that is between approximately ten percent (10%) and approximately seventy-five percent (75%) of the radius R of the shank 48.

In the above described configuration, mechanical interference between the extension 50 and the bit body 44 may prevent or hinder relative longitudinal movement between the extension 50 and the bit body 44 in directions parallel to the longitudinally axis $L_{42}$. In other words, any longitudinal force applied to the shank 48 by a drill string (not shown) during a drilling operation, or a substantial portion thereof, may be carried by the longitudinally interlocking joint between the extension 50 and the bit body 44. In particular, when any tensile longitudinal force is applied to the drill bit 42, the mechanical interference at the joint will cause at least a portion or small volume of the extension 50 and at least a portion or small volume of the bit body 44 at the interface between the abutting surfaces 56, 58 to be in compression.

As the joint may be configured such that mechanical interference between the extension 50 and the bit body 44 carries at least a portion of the longitudinal forces or loads applied to the drill bit 42, the joint may be configured to reduce or prevent any longitudinal forces or loads from being applied to the braze alloy 60 and/or weld 62 that also may be used to secure the extension 50 to the bit body 44. As a result, the joint between the extension 50 and the bit body 44 may prevent failure of the braze alloy 60 and the weld 62 between the bit body 44 and the extension 50 during drilling.

Figure 5:
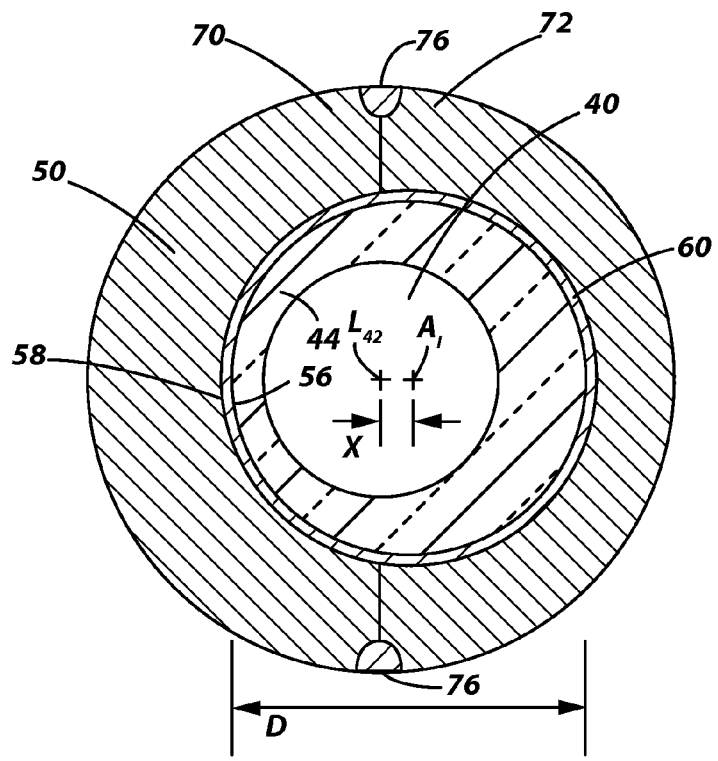
FIG. 5 is a transverse cross-sectional view of the earth-boring rotary drill bit shown in FIGS. 2-4 taken along section line A-A shown in FIG. 3.

In addition to carrying longitudinal loads, in some embodiments, mechanical interference between the extension 50 and the bit body 44 at the joint therebetween may be configured to carry at least a portion of any rotational or torsional loads applied to the drill bit 42 during drilling operations. FIG. 5 is a transverse cross-sectional view of the earth-boring rotary drill bit 42 of FIG. 3 taken along section line A-A shown therein. In some embodiments, the abutting surfaces 56, 58 forming the channel 66 and protrusion 68 of the joint between the extension 50 and the bit body 44 may be concentric to (i.e., both approximately centered) an interface axis $A_I$ that is not aligned with the longitudinal axis $L_{42}$ of the earth-boring rotary drill bit 42. For example, the interface axis $A_I$ may be offset or shifted (e.g., laterally offset or shifted) from or relative to the longitudinal axis $L_{42}$ of the earth-boring rotary drill bit 42. By way of example and not limitation, the interface axis $A_I$ may be laterally offset or shifted from or relative to the longitudinal axis $L_{42}$ of the earth-boring rotary drill bit 42 by a distance X that is between approximately one percent (1%) and approximately fifty percent (50%) of an exterior diameter D of the male connection portion 52 of the bit body 44. Furthermore, the abutting surfaces 56, 58 of the joint that are concentric to the interface axis $A_I$ may have a substantially circular shape, as shown in FIG. 5. In additional embodiments, the abutting surfaces 56, 58 of the joint that are concentric to the interface axis $A_1$ may have an ovular, elliptical, or polygonal shape, or any other simple or complex shape that is approximately centered about the interface axis $A_I$.

By forming or otherwise causing the abutting surfaces 56, 58 of the joint between the extension 50 and the bit body 44 to be concentric to the interface axis $A_I$ that is laterally offset or shifted from or relative to the longitudinal axis $L_{42}$ of the earth-boring rotary drill bit 42, as shown in FIG. 5, mechanical interference between the bit body 44 and the extension 50 may prevent or hinder relative rotational movement between both the extension 50 and the bit body 44. In other words, as a torque is applied to the shank 48 by a drill string or a drive shaft of a downhole motor (not shown) during a drilling operation, mechanical interference between the bit body 44 and the extension 50 may carry at least a portion of the torque and may prevent at least a portion of the torque from being carried by the braze alloy 60 and/or weld 62 between the bit body 44 and the extension 50. Thus, the abutting surfaces 56, 58 of the joint that are concentric to an interface axis $A_I$ that is laterally offset or shifted from or relative to the longitudinal axis $L_{42}$ of the earth-boring rotary drill bit 42 may prevent failure of the braze alloy 60 and/or the weld 62 and prevent rotational slippage at the interface between the abutting surfaces 56, 58 of the bit body 44 and the extension 50.

Figure 6:
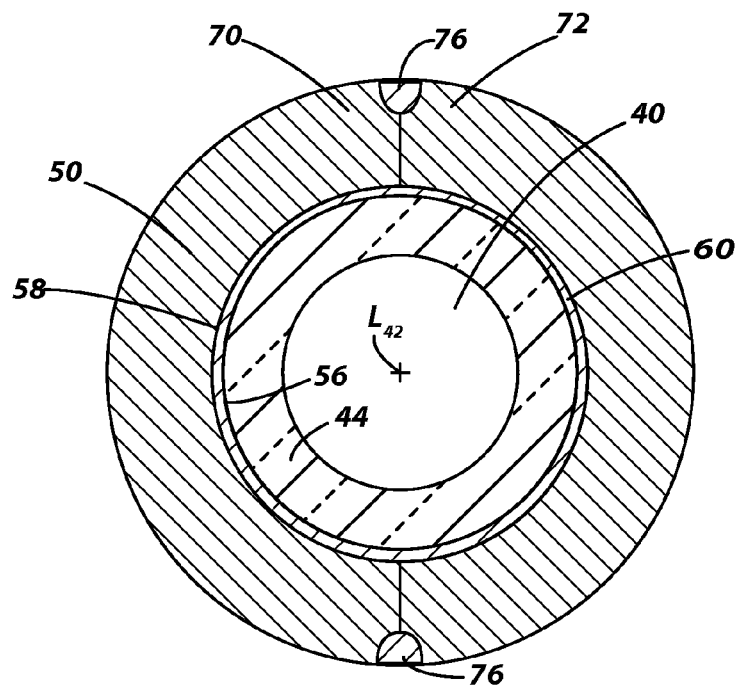
FIG. 6 is a transverse cross-sectional view like that of FIG. 5 illustrating another embodiment of an earth-boring rotary drill bit of the present invention.

In some situations, however, it may not be necessary or desired to form or otherwise cause the abutting surfaces 56, 58 of the joint to be concentric to an interface axis $A_I$ that is laterally offset or shifted from or relative to the longitudinal axis $L_{42}$ of the rotary drill bit 42. In additional embodiments, the abutting surfaces 56, 58 may be concentric to the longitudinal axis $L_{42}$ of the earth-boring rotary drill bit 42, as shown in FIG. 6.

Thus, by configuring the earth-boring rotary drill bit 42 with a joint between the extension 50 and the bit body 44 that includes one or more longitudinally interlocking channels 66 and protrusions 68, and by configuring the abutting surfaces 56, 58 of the joint to be concentric to an interface axis $A_I$ that is laterally offset or shifted from or relative to the longitudinal axis $L_{42}$, mechanical interference between the extension 50 and the bit body 44 at the joint may carry both longitudinal and torsional forces or loads applied to the drill bit 42 during drilling and may prevent failure of the braze alloy 60 and/or the weld 62 between the bit body 44 and the extension 50 due to such longitudinal and torsional forces.

As shown in FIG. 2, and more particularly in the exploded longitudinal cross-sectional view of FIG. 4, the extension may comprise two or more separate portions 70, 72 or members that may be assembled around the male connection portion 52 of the bit body 44 and secured together. By forming the extension 50 from two or more separate portions or members, the extension 50 may be assembled around the male connection portion 52 of the bit body 44 such that the protrusion 68 of the extension 50 is longitudinally interlocked with and secured within the channel 66 of the bit body 44. As shown in FIG. 2, a weld groove 74 may be provided along each interface between the two or more separate portions 70, 72 of the extension 50 to facilitate welding the two or more separate portions 70, 72 together along the weld grooves 74. In other words, the two separate portions 70, 72 of the extension 50 may be secured together around the male connection portion 52 of the bit body by at least one weld 76 (FIG. 5) formed in each of the longitudinally extending weld grooves 74. In additional embodiments, the two separate portions 70, 72 may be secured together by one or more of a braze alloy, a swage, and mechanical fastening means in addition to or in place of the welds 76.

Figure 7:
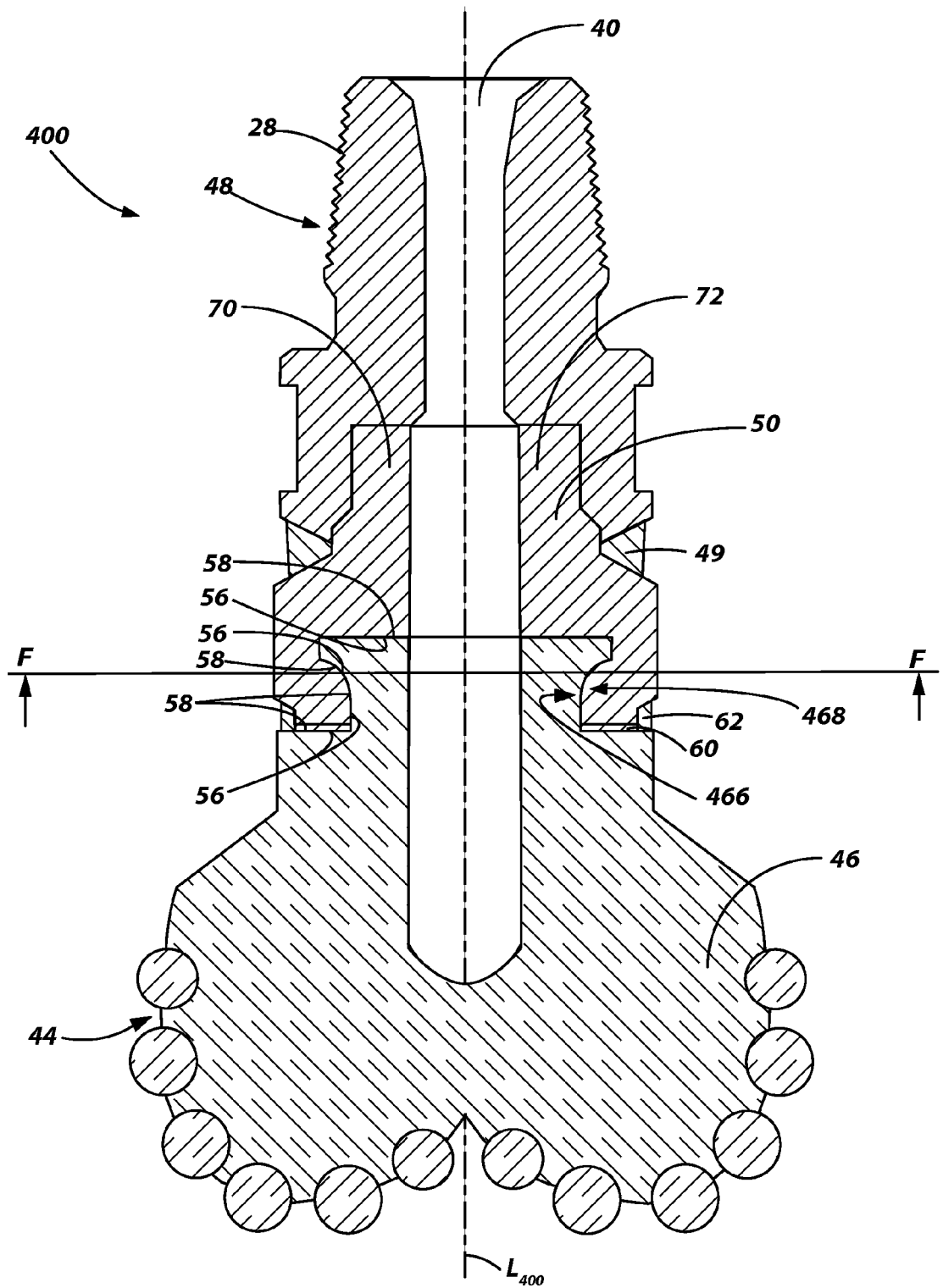
FIG. 7 is a longitudinal cross-sectional view of another embodiment of an earth-boring rotary drill bit of the present invention that includes a bit body and a shank assembly having abutting surfaces comprising an arcuate geometry.

FIG. 7 is a longitudinal cross-sectional view of another embodiment of an earth-boring rotary drill bit 400 of the present invention. Like the previously described drill bit 42, the earth-boring rotary drill bit 400 shown in FIG. 7 does not include a metal blank, such as the metal blank 16 of the drill bit 10 (FIG. 1). Instead, the rotary drill bit 400 comprises a shank assembly, which includes a shank 48 secured to an extension 50, secured directly to the particle-matrix composite material 46 of a bit body 44.

The earth-boring rotary drill bit 400 is similar to the drill bit 42 shown in FIG. 3 and retains the same reference numerals for similar features. Similar to the drill bit 42, the extension 50 of the drill bit 400 may comprise a female connection portion 54 which is configured to receive a male connection portion 52 of the bit body 44 therein to form a joint between the extension 50 and the bit body 44. However, as shown in FIG. 7, the interlocking channel 466 and protrusion 468 forming the joint between the extension 50 and the bit body 44 may not be generally rectangular. As shown in FIG. 7, an interlocking channel 466 and protrusion 468 may comprise a generally arcuate shape.

While the geometries of the interlocking channels 466, 66 and protrusions 468, 68 of the previously described drill bits 42, 400 are shown having a particular geometry, the embodiments of the present invention is not so limited and the interlocking channel and protrusion forming the load-bearing joint may comprise any complex or simple geometry that will carry at least a portion of any longitudinal and/or torsional load that may be applied to the drill bit during drilling operations.

Figure 8:
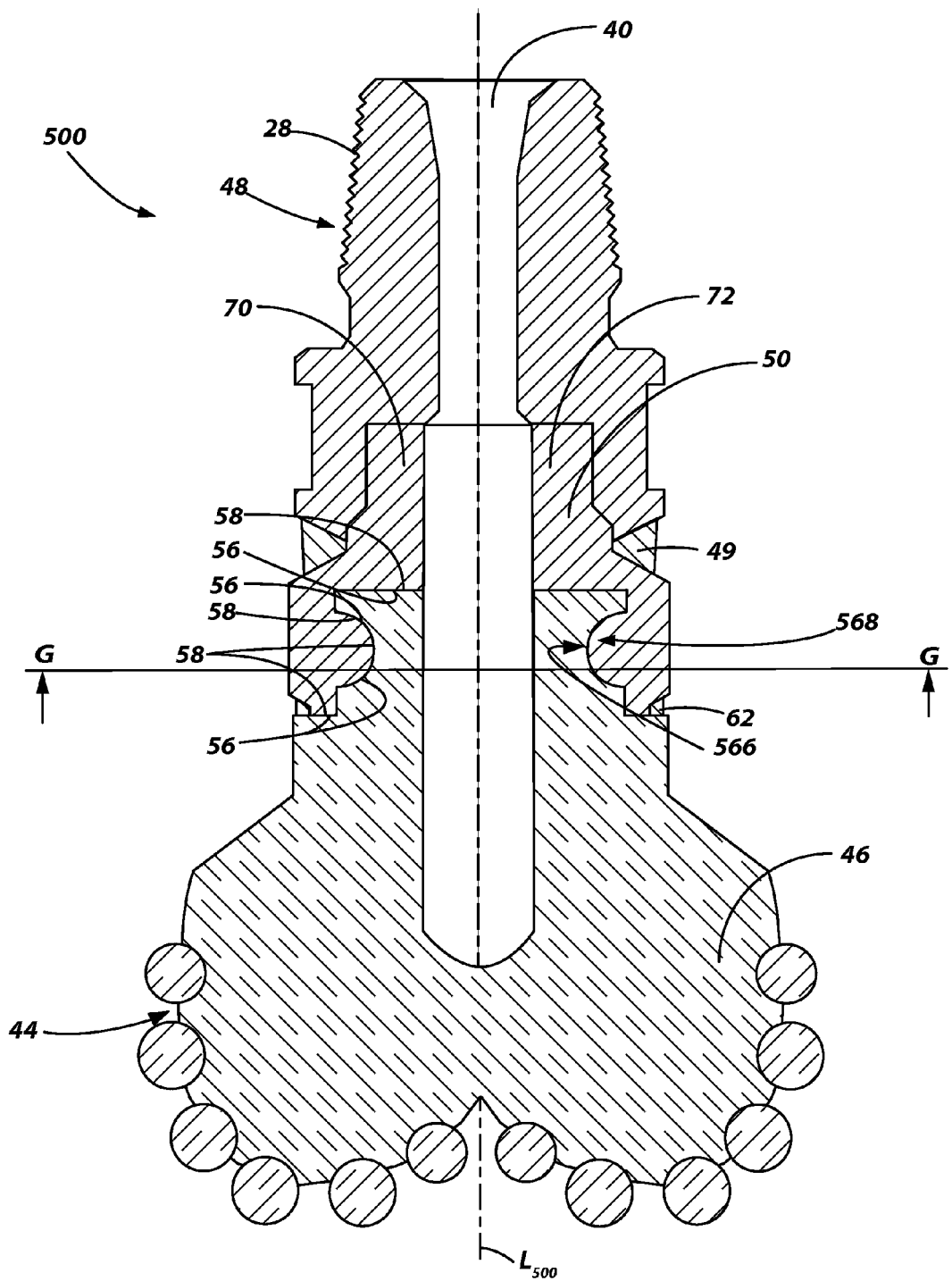
FIG. 8 is a longitudinal cross-sectional view of another embodiment of an earth-boring rotary drill bit of the present invention that includes a bit body and a shank assembly having abutting surfaces comprising semi-circular geometry.

FIG. 8 is a longitudinal cross-sectional view of another embodiment of an earth-boring rotary drill bit 500 of the present invention. Like the previously described drill bits 42, 400, the earth-boring rotary drill bit 500 shown in FIG. 8 does not include a metal blank, such as the metal blank 16 of the drill bit 10 (FIG. 1). Instead, the rotary drill bit 500 comprises a shank assembly, which includes a shank 48 secured to an extension 50, secured directly to the particle-matrix composite material 46 of a bit body 44.

The earth-boring rotary drill bit 500 illustrates another non-limiting geometry in which the interlocking channel and protrusion forming the load-bearing joint may be configured. In particular, as shown in FIG. 8, the interlocking channel 566 and protrusion 568 of the earth-boring rotary drill bit 500 may be configured in a semi-circular geometry.

Figure 9:
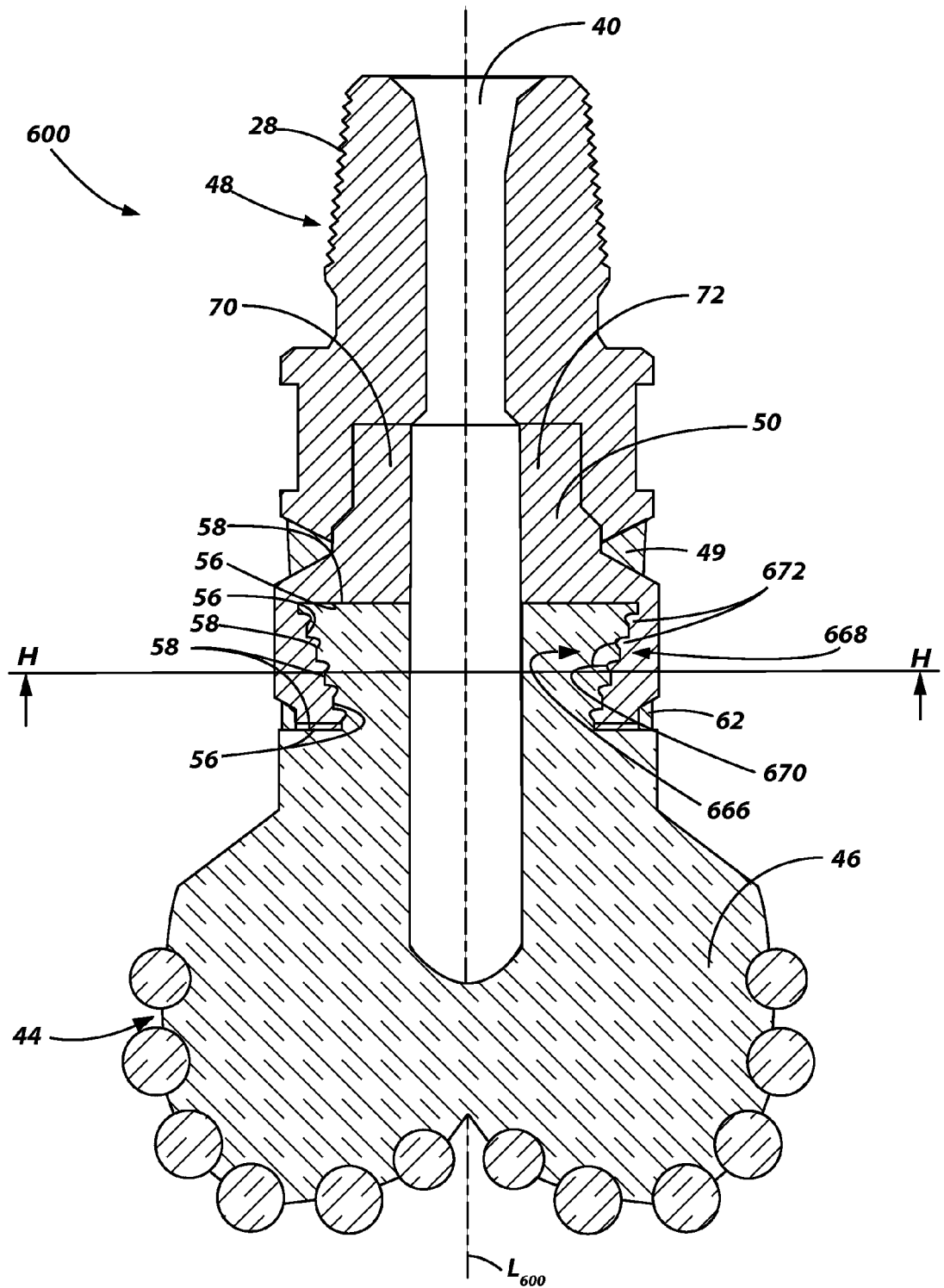
FIG. 9 is a longitudinal cross-sectional view of another embodiment of an earth-boring rotary drill bit of the present invention that includes a bit body and a shank assembly having abutting surfaces comprising a plurality of channels and protrusions.

FIG. 9 is a longitudinal cross-sectional view of another embodiment of an earth-boring rotary drill bit 600 of the present invention. Like the previously described drill bit 42, the earth-boring rotary drill bit 600 shown in FIG. 9 does not include a metal blank, such as the metal blank 16 of the drill bit 10 (FIG. 1). Instead, the rotary drill bit 600 comprises a shank assembly, which includes a shank 48 secured to an extension 50, secured directly to the particle-matrix composite material 46 of a bit body 44.

The earth-boring rotary drill bit 400 is similar to the drill bit 42 shown in FIG. 3 and retains the same reference numerals for similar features. However, as shown in FIG. 9, the interlocking channel 666 may comprise a plurality of smaller channels 670 and the interlocking protrusion 668 may comprise a plurality of smaller protrusions 672.

Figure 10:
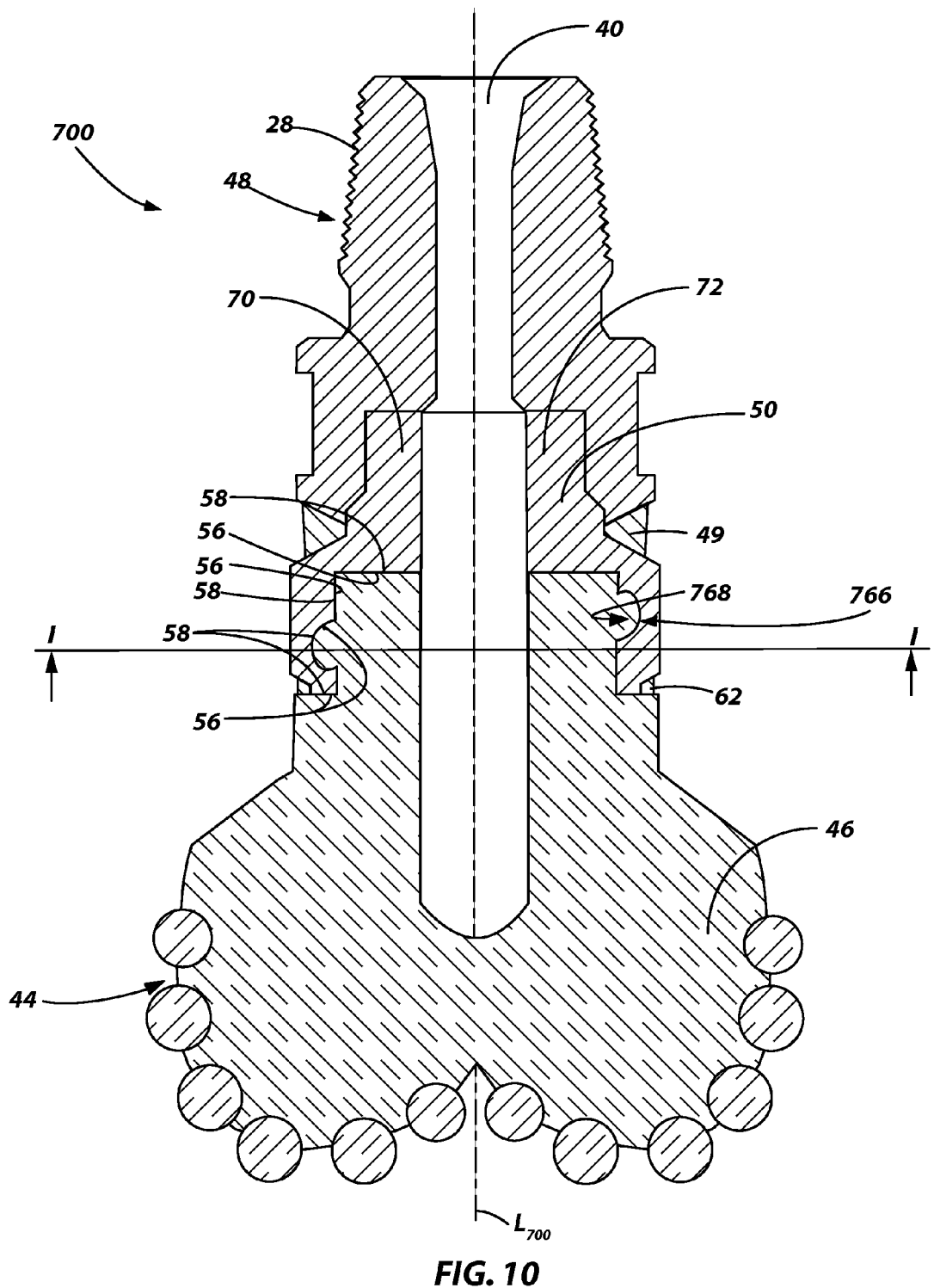
FIG. 10 is a longitudinal cross-sectional view of another embodiment of an earth-boring rotary drill bit of the present invention that includes a bit body having a protrusion secured at least partially within a channel of a shank assembly.

FIG. 10 is a longitudinal cross-sectional view of yet another embodiment of an earth-boring rotary drill bit 700 of the present invention. Like the previously described drill bit 42, the earth-boring rotary drill bit 700 shown in FIG. 10 does not include a metal blank, such as the metal blank 16 of the drill bit 10 (FIG. 1). Instead, the rotary drill bit 700 comprises a shank assembly, which includes a shank 48 secured to an extension 50, secured directly to the particle-matrix composite material 46 of a bit body 44.

The earth-boring rotary drill bit 700 is similar to the drill bit 42 shown in FIG. 3 and retains the same reference numerals for similar features. However, as shown in FIG. 10, the surfaces of the bit body 44 may comprise or define at least one protrusion 768 and the surfaces of the extension 50 may comprise or define the channel 766. As shown in FIG. 10, the at least one protrusion 768 and the channel 766 may extend around the longitudinal axis $L_{700}$ of the drill bit 700 in a plane oriented at an angle to the longitudinal axis $L_{700}$.

Each of the joints between the extensions 50 and the bit bodies 44 of the earth-boring rotary drill bits 400, 500, 600, 700 may be configured such that mechanical interference between the extension 50 and the bit body 44 carries all or a selected portion of any longitudinal and torsional loads applied to the drill bits 400, 500, 600, 700 during drilling operations. Thus, the channels 466, 566, 666, 766 and the protrusions 468, 568, 668, 768 may be configured to longitudinally interlock with one another, and the abutting surfaces 56, 58 may be concentric to (i.e., both approximately centered about) an interface axis $A_I$ that is not aligned with the longitudinal axes $L_{400}$, $L_{500}$, $L_{600}$, $L_{700}$ of the earth-boring rotary drill bits 400, 500, 600, 700, in a manner similar to that described above in reference to the earth-boring rotary drill bit 42.

Additionally, the bit body 44 and the extension 50 of the earth-boring rotary drill bits 400, 500, 600, 700 may be configured such that a transverse cross-sectional view of the earth-boring rotary drill bits 400, 500, 600, 700 taken along section lines F-F, G-G, H-H, I-I shown in FIGS. 7-11 respectively appears substantially similar to FIG. 5 or to FIG. 6. The extension 50 may comprise two or more separate portions 70, 72, which may be secured together around the male connection portion 52 of the bit body 44 in a manner similar to the two or more separate portions 70, 72 of the extension 50 described above in relation to the earth-boring rotary drill bit 42 shown in FIGS. 2-5.

Figure 11:
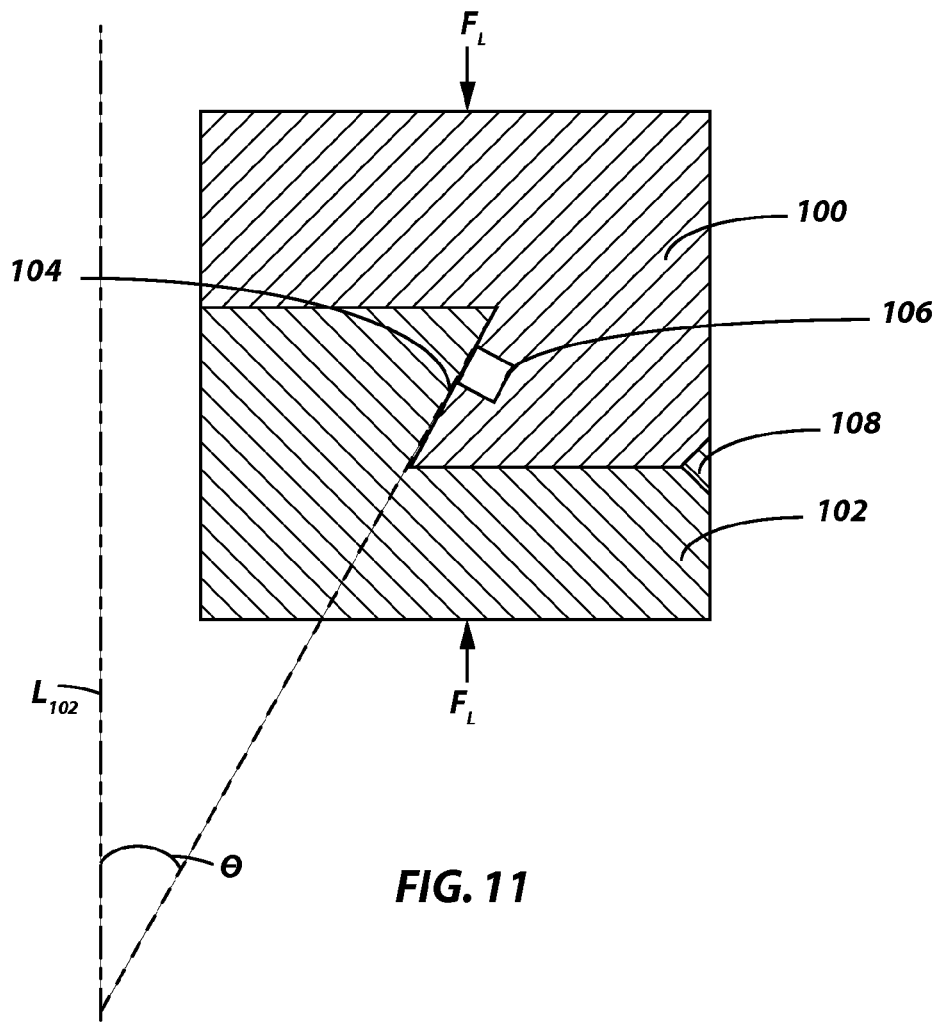
FIG. 11 is a partial longitudinal cross-sectional schematic view of a portion of an interface between a shank assembly and a bit body.
Figure 12:
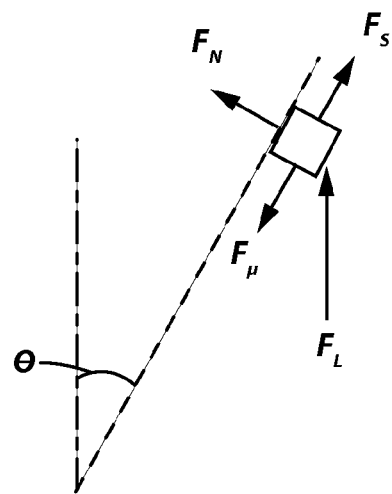
FIG. 12 is a two-dimensional free body diagram of an infinitesimally small portion of the loaded interface shown in FIG. 11 illustrating forces acting thereon.

In additional embodiments of the present invention, the percentage of the longitudinal load applied to the drill bit 42 during drilling operations may be selectively apportioned between mechanical interference within the joint (mechanical interference between the extension 50 and the bit body 44) and the weld 62 (and/or braze alloy 60) at the joint to ensure that the weld 62 is not subjected to loads beyond its load-bearing capability. FIGS. 11 and 12 are simplified schematic illustrations presented herein to assist in describing methods that may be used to selectively apportion the percentage of a longitudinal load that is applied to a joint (e.g., the joint between the extension 50 and the bit body 44) between mechanical interference and a weld (and/or a braze alloy) at the joint. FIG. 11 illustrates, as a non-limiting example used for description purposes, a steel extension 100 that is secured to a tungsten carbide bit body 102 in a manner similar to that previously described in relation to the drill bit 42 (FIGS. 2-5), except that the interlocking protrusion and channel between the extension 100 and the bit body 102 have abutting surfaces that have a generally frustoconical shape along the interface therebetween. The steel extension 100 and the tungsten carbide bit body 102 are illustrated being subjected to longitudinal forces $F_L$, like those that may be experienced by a drill bit during drilling operations. FIG. 11 illustrates a virtual infinitesimally small portion 106 of the loaded interface between the steel extension 100 and the tungsten carbide bit body 102. It is assumed that the infinitesimally small portion 106 is disposed along a plane 104 that is tangent to the interface between the extension 100 and the bit body 102, the plane 104 being oriented at an angle $\theta$ with respect to a longitudinal axis $L_{102}$ of the bit body 102. A static coefficient of friction $\mu$ may be exhibited between the extension 100 and the bit body 102.

The forces acting on the infinitesimally small portion 106 are shown on the free body diagram of FIG. 12. The longitudinal forces $F_L$ acting on the drill bit may be resolved into a number of component forces including a normal force $F_N$ that is oriented normal to the plane 104, a sliding force $F_S$ that is oriented parallel to the plane 104, and a frictional force $F_\mu$ that is also oriented parallel to the plane 104, but opposite to the sliding force $F_S$. The normal force $F_N$ equals the longitudinal force $F_L$ multiplied by the sine of the angle $\theta$; the sliding force $F_S$ equals the longitudinal force $F_L$ multiplied by the cosine of the angle $\theta$; and the frictional force $F_\mu$ equals the normal force $F_N$ multiplied by the coefficient of friction $\mu$.

When the sliding force $F_S$ is greater than the frictional force $F_\mu$ ($\mu^* F_L^* \sin\theta < F_L^* \cos\theta$ (i.e., $\mu < \cot\theta$)), longitudinal sliding will occur between the extension 100 and bit body 102. Thus, when $\mu > \cot\theta$, no longitudinal sliding will occur regardless of the magnitude of the longitudinal force $F_L$ applied to the bit body 102 and the extension 100. Therefore, the critical angle $\theta_c$ at which no sliding will occur equals the arc-cotangent of $\mu$. Thus, no sliding will occur if the angle $\theta$ is larger than the critical angle $\theta_c$, but sliding may occur if the angle $\theta$ is smaller than the critical angle $\theta_c$. In theory, the amount of the longitudinal load or force $F_L$ causing any slippage will be the difference between the sliding force $F_S$ and the friction force $F_\mu$. Thus, the percentage P of any longitudinal load or force $F_L$ that will cause any slippage is equal to $100^*(\cos\theta - \mu^* \sin\theta)$.

Thus, for a given coefficient of friction $\mu$ between a bit body 102 and an extension 100, if the angle $\theta$ is greater than the critical angle $\theta_c$ (arc-cotangent $\mu$), when a longitudinal load is applied to the extension 100 or bit body 102 during drilling, the bit body 102 may exhibit the tendency to slide relative to the extension 100, and a portion of the longitudinal load would be transferred to the weld 108 securing the bit body 102 and the extension 100 together. In theory, the percentage of any longitudinal load applied to the bit body 102 and the extension 100 that may be transferred to the weld 108 will be equal to $100^*(\cos\theta - \mu^* \sin\theta)$. Based on these calculations, the sizing of the angle $\theta$ may allow any longitudinal load applied to the bit body 102 and the extension 100 to be selectively apportioned between the weld 108 and the mechanical interference between the extension 100 and the bit body 102 at the joint therebetween. As the weld 108 may be robust, it may not be necessary to completely prevent any load from being carried by the weld 108. Therefore, in some embodiments, the angle $\theta$ may be calculated based on the strength of the weld 108 and manufacturing capabilities.

As a non-limiting example, when the extension 100 is formed from steel and the bit body 102 is formed from tungsten carbide, the coefficient of friction $\mu$ therebetween may be between approximately 0.4 and 0.6. When the coefficient of friction is between approximately 0.4 and 0.6, the critical angle $\theta_c$ at which no axial load may be carried by the weld 108 may be between approximately sixty-eight degrees (68°) and approximately fifty-nine degrees (59°). Therefore, the range of the angle $\theta$ at which a portion of any longitudinal load may be transferred to the weld 108 may be between approximately one degree (1°) and approximately seventy degrees (70°).

Each of the examples of ranges or particular angles described above in relation to the angle $\theta$ may be absolute angles. Thus, the plane 104 between the bit body 102 and the extension 100, which extends at the angle $\theta$ relative to the longitudinal axis $L_{102}$, may extend radially outward and longitudinally upward relative to the longitudinal axis $L_{102}$ or radially inward and longitudinally downward relative to the longitudinal axis $L_{102}$.

Figure 13:
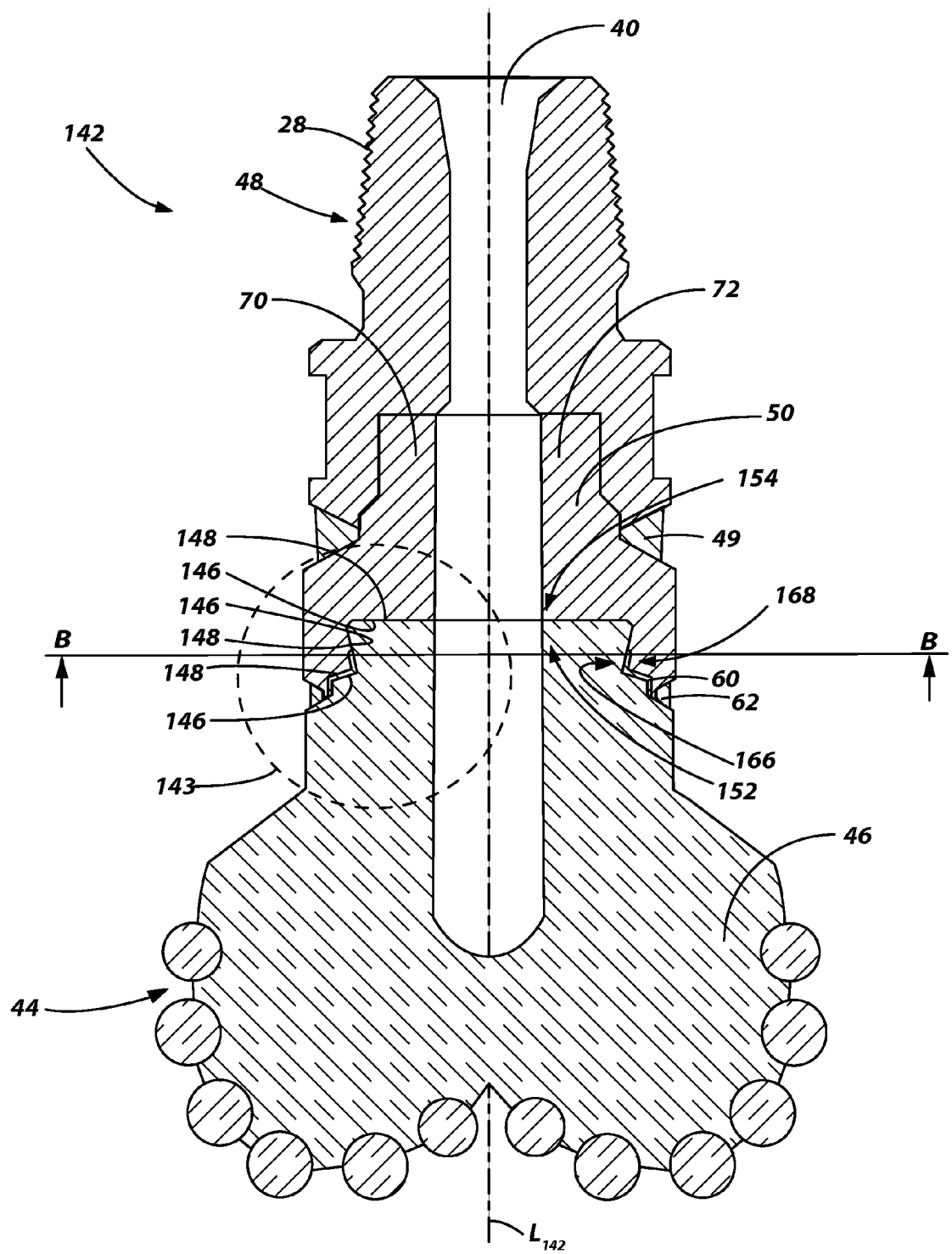
FIG. 13 is a longitudinal cross-sectional view of another embodiment of an earth-boring rotary drill bit of the present invention that includes a bit body having at least one surface oriented at an angle to the longitudinal axis of the drill bit, the surface abutting against a complementary surface of a shank assembly.
Figure 14:
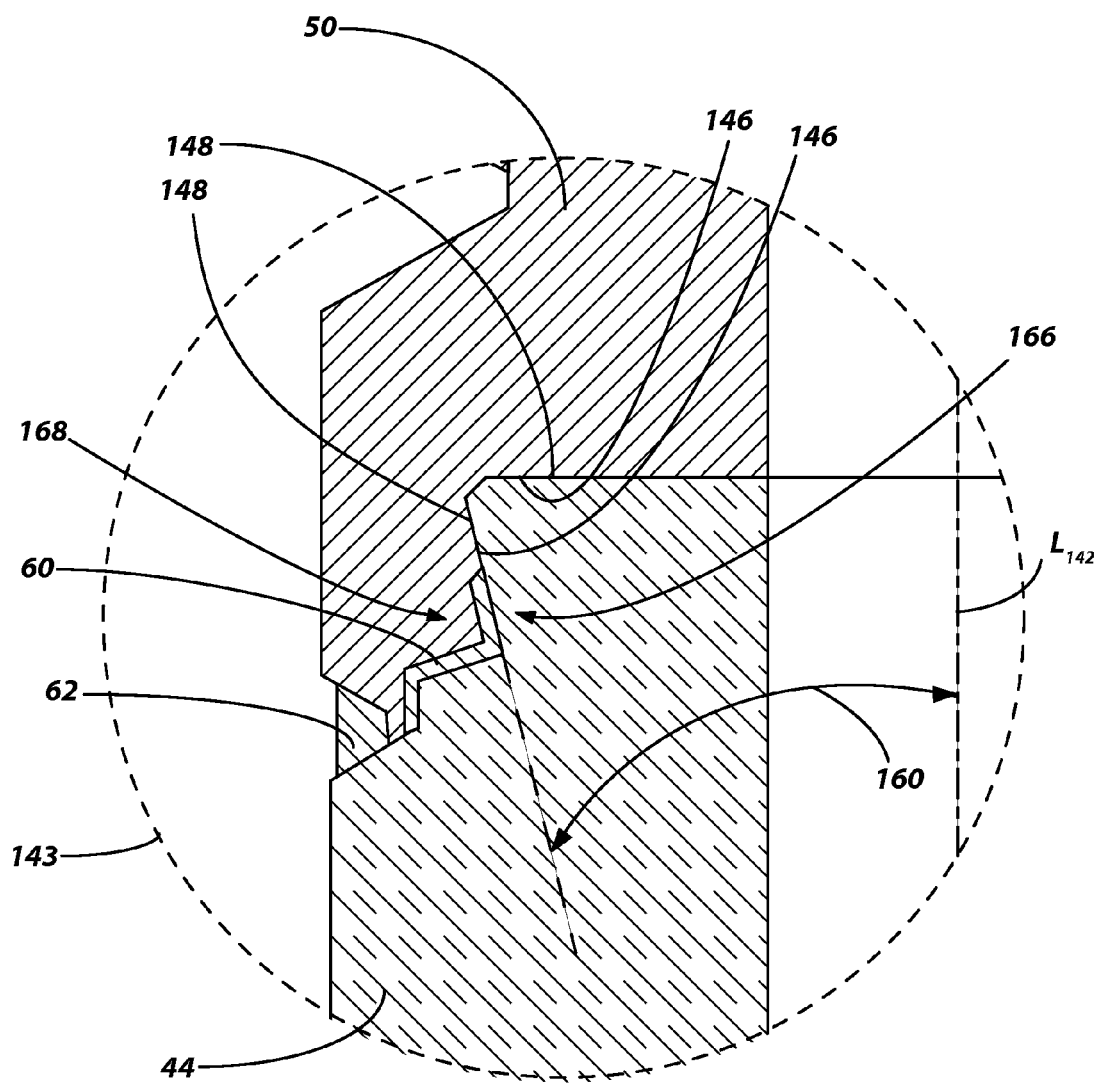
FIG. 14 is an enlarged view of a portion of the earth-boring rotary drill bit shown in FIG. 13.

FIG. 13 is a longitudinal cross-sectional view of another earth-boring rotary drill bit 142 of the present invention formed using the methods described above in relation to FIGS. 11 and 12. The earth-boring rotary drill bit 142 is substantially similar to the drill bit 42 shown in FIGS. 2-5 and retains the same reference numerals for similar features. Like the previously described drill bit 42, the earth-boring rotary drill bit 142 does not include a metal blank, such as the metal blank 16 of the drill bit 10 (FIG. 1), but includes a shank assembly comprising a shank 48 and an extension 50 secured directly to the particle-matrix composite material 46 of the bit body 44. However, as shown in FIGS. 13 and 14 (FIG. 14 being an enlarged view of the portion of the earth-boring rotary drill bit 142 within the circle 143 shown in FIG. 13), a male connection portion 152 and channel 166 of the bit body 44 and the female connection portion 154 and the protrusion 168 of the extension 50 may be defined by at least one surface 146, 148 that extends at an angle 160 relative the longitudinal axis $L_{142}$ of the earth-boring rotary drill bit 142. As shown in FIGS. 13 and 14, the channel 166 and the protrusion 168 longitudinally interlock in a manner similar to that of the channel 66 and the protrusion 68 previously described in relation to the earth-boring rotary drill bit 42 shown in FIGS. 2-5.

As described above in relation to the angle θ shown in FIGS. 11 and 12, the angle 160 (FIG. 14) may be configured such that a portion of any longitudinal load applied to the earth-boring rotary drill bit 142 may be selectively apportioned between mechanical interference at the joint between the extension 50 and the bit body 44 and the weld 62 (and/or braze alloy 60).

In some embodiments, the angle 160 (FIG. 14) may be greater than or equal to the arc-cotangent of the coefficient of friction between the abutting surfaces 146, 148 of the bit body 44 and the extension 50. In such a configuration, substantially the entire longitudinal load applied to the earth-boring rotary drill bit 142 may be carried by the mechanical interference between the extension 50 and the bit body 44 at the joint therebetween. In additional embodiments, the angle 160 may be selected to be less than the arc-cotangent of the coefficient of friction between the abutting surfaces 146, 148 of the bit body 44 and the extension 50. In such a configuration, a selected portion of the longitudinal load applied to the earth-boring rotary drill bit 142 may be carried by the mechanical interference between the extension 50 and the bit body 44 at the joint therebetween, and the remaining portion of the longitudinal load applied to the earth-boring rotary drill bit 142 may be carried by the weld 62 (and/or the braze alloy 60).

In some embodiments, the angle 160 may comprise an angle between approximately one degree (1°) and approximately seventy-five degrees (75°). In other embodiments, the angle 160 may comprise an angle between approximately ten degrees (10°) and approximately sixty degrees (60°). In the particular embodiment shown in FIGS. 13 and 14 as a non-limiting example, the angle 160 may be approximately fifteen degrees (15°). When the angle 160 equals approximately fifteen degrees (15°) and the coefficient of friction between the abutting surfaces 146, 148 of the bit body 44 and the extension 50 is equal to approximately 0.5, the percentage of any longitudinal load applied to the shank 48 that may be carried by the weld 62 (and/or the braze alloy 60) may be approximately eighty-four percent (84%) of the total longitudinal load.

By orienting at least one surface, or portion thereof, 146, 148 of each of the channel 166 and the protrusion 168 at an angle 160 as shown in FIGS. 13 and 14, and by configuring the channel 166 and the protrusion 168 to longitudinally interlock, the joint between the bit body 44 and the extension 50 may be configured to reduce or prevent any portion of the longitudinal load that may be applied to the earth-boring rotary drill bit 142 during drilling operations from being applied to the weld 62 (and/or the braze alloy 60) between the bit body 44 and the extension 50.

The bit body 44 and the extension 50 of the earth-boring rotary drill bit 142 may be formed or otherwise provided in any number of different configurations that embody teachings of the present invention. For example, the bit body 44 and the extension 50 of the earth-boring rotary drill bit 142 may be formed or otherwise provided such that a transverse cross-sectional view of the earth-boring rotary drill bit 142, taken along section line B-B shown in FIG. 13, appears substantially similar to FIG. 5 or to FIG. 6. In other words, the abutting surfaces 146, 148 of the joint between the bit body 44 and the extension 50 may be configured to be concentric to the interface axis $A_I$ that is laterally offset or shifted from or relative to the longitudinal axis $L_{142}$ of the earth-boring rotary drill bit 142 (in a manner similar to that shown in FIG. 5), or they may be configured to be concentric to the longitudinal axis $L_{142}$ of the earth-boring rotary drill bit 142 (in a manner similar to that shown in FIG. 6).

Furthermore, the extension 50 of the earth-boring rotary drill bit 142 may comprise two or more separate portions 70, 72, which may be secured together around the male connection portion 152 of the bit body 44 as described above in relation to the two or more separate portions 70, 72 of the earth-boring rotary drill bit 42 shown in FIGS. 2-5.

Figure 15:
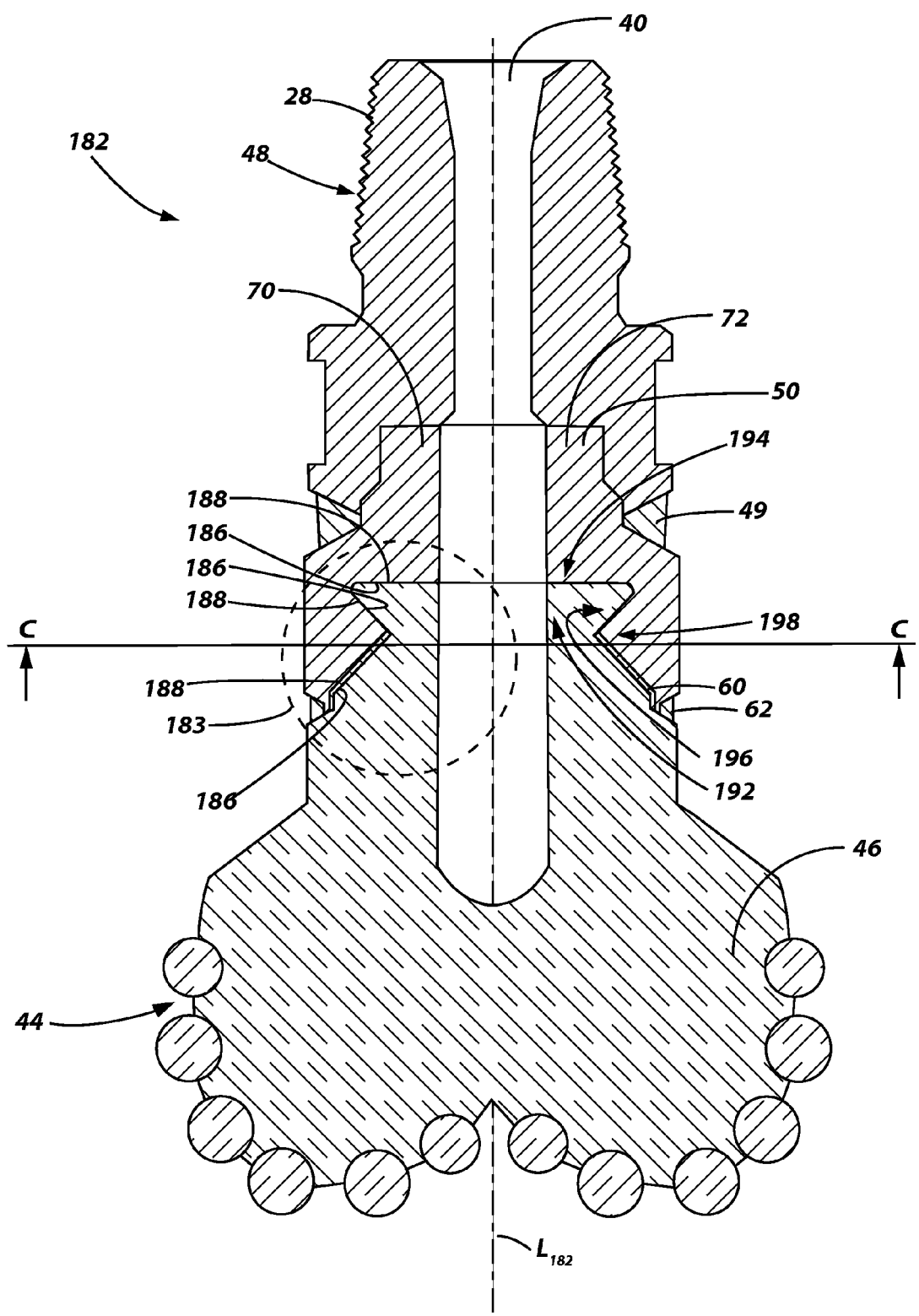
FIG. 15 is a longitudinal cross-sectional view of another embodiment of an earth-boring rotary drill bit of the present invention that includes a bit body having at least one surface oriented at an acute angle to the longitudinal axis of the drill bit, the at least one surface abutting against a complementary surface of a shank assembly.
Figure 16:
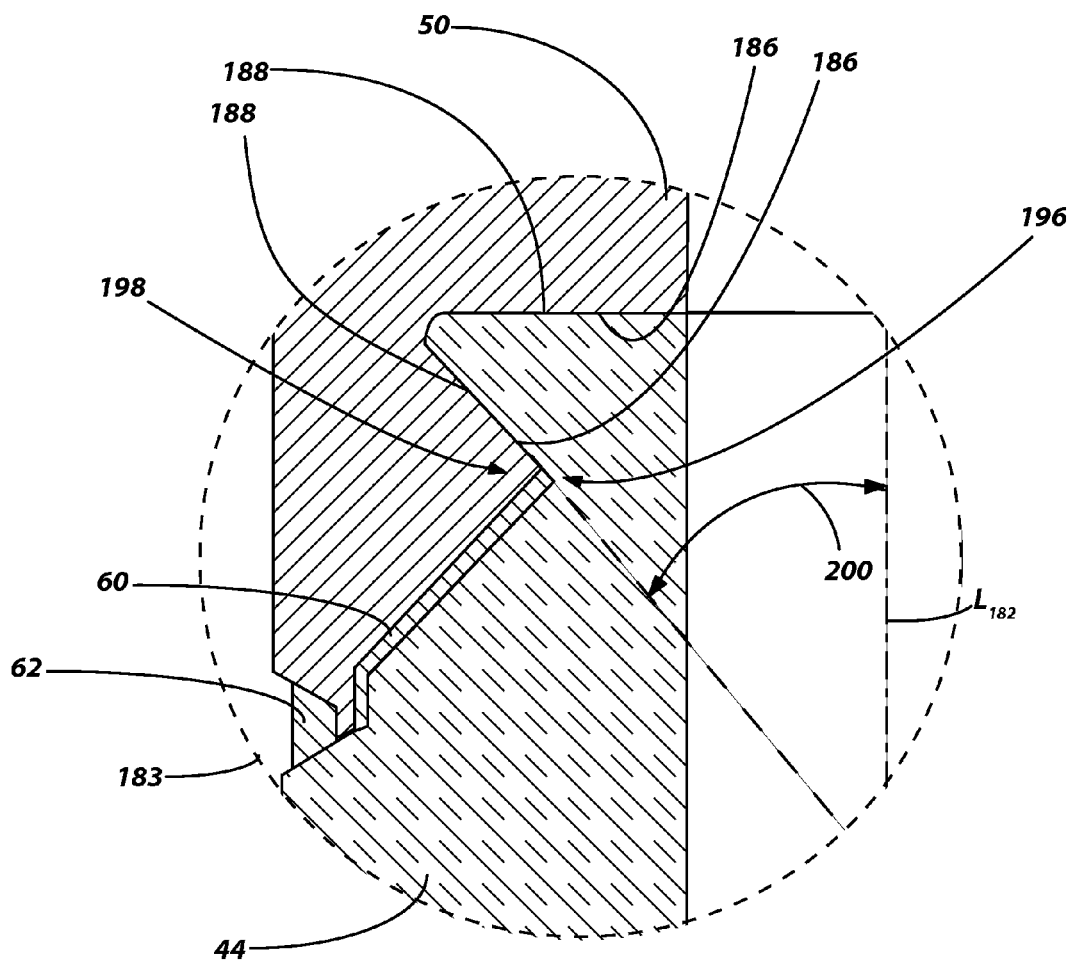
FIG. 16 is an enlarged view of a portion of the earth-boring rotary drill bit shown in FIG. 15.

FIG. 15 is a longitudinal cross-sectional view of another embodiment of an earth-boring rotary drill bit 182 of the present invention formed using the methods described above in relation to FIGS. 11 and 12. FIG. 16 is an enlarged view of the portion of the earth-boring rotary drill bit 182 within the circle 183 shown in FIG. 15. The earth-boring rotary drill bit 182 is substantially similar to the drill bit 42 shown in FIGS. 2-5 and retains the same reference numerals for similar features. As shown in FIGS. 15 and 16, a male connection portion 192 and channel 196 of the bit body 44 and a female connection portion 194 and a protrusion 198 of the extension 50 may be defined by surfaces 186, 188 oriented at an angle 200 (FIG. 16) relative to the longitudinal axis $L_{182}$ of the earth-boring rotary drill bit 182. The channel 196 and the protrusion 198 longitudinally interlock with one another in a manner similar to that previously described in relation to the channel 66 and the protrusion 68 of the earth-boring rotary drill bit 42 shown in FIGS. 2-5.

The angle 200 may be configured such that a portion of any longitudinal load applied to the earth-boring rotary drill bit 182 may be selectively apportioned between mechanical interference between the male connection portion 192 and the female connection portion 194 (at the joint between the extension 50 and the bit body 44) and the weld 62 (and/or the brazing alloy 60). In the particular, non-limiting example shown in FIGS. 15 and 16, the angle 200 may be approximately forty-five degrees (45°). When the angle 200 equals approximately forty-five degrees (45°) and the coefficient of friction between the abutting surfaces 186, 188 of the bit body 44 and the extension 50 is equal to approximately 0.5, the percentage of any longitudinal load applied to the drill bit 182 that may be carried by the weld 62 (and/or the braze alloy 60) may be approximately thirty-five percent (35%) of the total longitudinal load. In additional embodiments, however, the angle 200 may be selected to be equal to or greater than the critical angle, such that substantially the entire longitudinal load applied to the drill bit 182 may be carried by the mechanical interference between the bit body 44 and the extension 50.

The bit body 44 and the extension 50 of the earth-boring rotary drill bit 182 may be formed or otherwise provided in any number of different configurations that embody teachings of the present invention. For example, the bit body 44 and the extension 50 of the earth-boring rotary drill bit 182 may be formed or otherwise provided such that a transverse cross-sectional view of the earth-boring rotary drill bit 182, taken along section line C-C shown in FIG. 15, appears substantially similar to FIG. 5 or to FIG. 6. In other words, the abutting surfaces 186, 188 of the joint, may be configured to be concentric to an interface axis $A_I$ that is laterally offset or shifted from or relative to a longitudinal axis $L_{182}$ of the earth-boring rotary drill bit 182, in a manner similar to that shown in FIG. 5. As discussed above, by configuring the earth-boring rotary drill bit 182 with a joint including the channel 196 and protrusion 198 which longitudinally interlock and by configuring the abutting surfaces 186, 188 of the joint to be concentric to an interface axis $A_I$ that is laterally offset or shifted from or relative to the longitudinal axis $_{L182}$, the mechanical interference at the joint between the bit body 44 and the extension 50 may carry both longitudinal and torsional forces or loads applied to the drill bit during the drilling process and may prevent failure of the weld 62 (and/or the braze alloy 60) between the bit body 44 and the extension 50 due to such longitudinal and torsional forces.

In additional embodiments, the abutting surfaces 186, 188 of the joint of the earth-boring rotary drill bit 182, may be configured to be concentric to the longitudinal axis $L_{182}$ of the earth-boring rotary drill bit 182, in a manner similar to that shown in FIG. 6.

Furthermore, the extension 50 of the earth-boring rotary drill bit 182 may comprise two or more separate portions 70, 72 which may be secured together around the male connection portion 192 of the bit body 44 as described above in relation to the two separate portions 70, 72 of the earth-boring rotary drill bit 42 shown in FIGS. 2-5.

Figure 17:
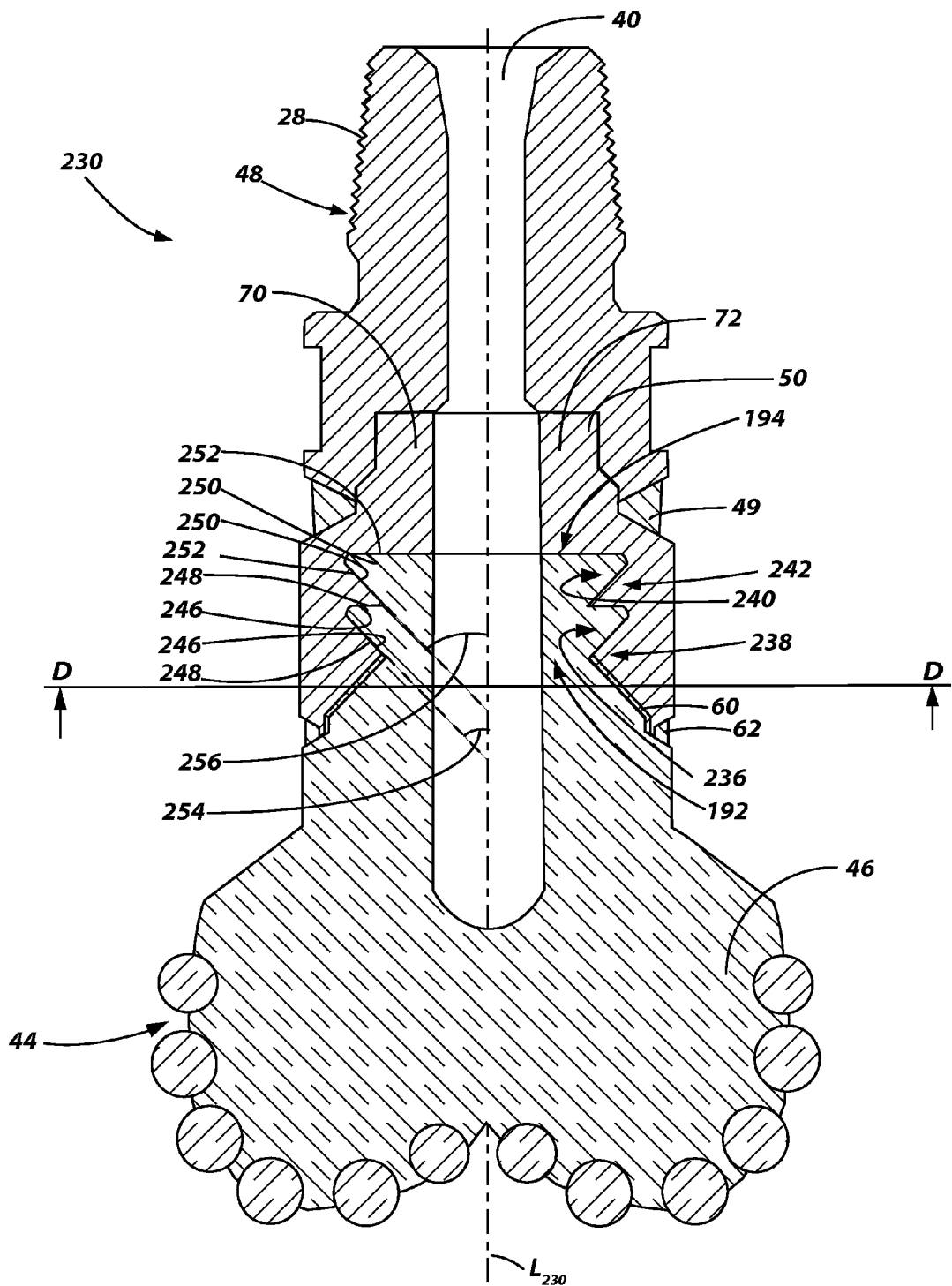
FIG. 17 is a longitudinal cross-sectional view of another embodiment of an earth-boring rotary drill bit of the present invention that includes a bit body and an extension having two longitudinally interlocking channels and protrusions.

FIG. 17 is a longitudinal cross-sectional view of another embodiment of an earth-boring rotary drill bit 230 of the present invention formed using methods described herein. The earth-boring rotary drill bit 230 is substantially similar to the drill bit 182 shown in FIGS. 15 and 16 and retains the same reference numerals for similar features. Like the previously described drill bits 42, 142, and 182, the earth-boring rotary drill bit 230 shown in FIG. 17 includes a shank assembly comprising an extension 50 secured directly to the particle-matrix composite material 46 of the bit body 44. As shown in FIG. 17, however, the joint between the extension 50 and the bit body 44 may include more than one longitudinally interlocking channel and protrusion. The non-limiting example embodiment shown in FIG. 17 includes two longitudinally interlocking channels 236, 240 and two complementary protrusions 238, 242. In additional embodiments, however, the bit body 44 may include any number of channels and the extension 50 may include any number of corresponding protrusions.

Similar to the channel 196 described above in relation to FIG. 15, each of the channels 236, 240 may be defined by at least one surface 246, 250 of the bit body 44, and each of the protrusions 238, 242 may be defined by at least one surface 248, 252 of the extension 50. The abutting surfaces 246, 248, and the abutting surfaces 250, 252, each may be oriented at an angle 254, 256 relative the longitudinal axis $L_{230}$ of the earth-boring rotary drill bit 230, and may have a frustoconical shape. The angles 254, 256 may fall within the ranges described previously in relation to the angle 160 (FIG. 14). In some embodiments, the angle 254 may be substantially equal to angle 256. In additional embodiments, the angle 254 may differ from the angle 256.

By orienting the abutting surfaces 246, 248 of the channel 236 and the protrusion 238 at an angle 254, and orienting the abutting surfaces 248, 252 of each of the channel 240 and the protrusion 242 at an angle 256 as shown in FIG. 17, and by configuring the channels 236, 240 and the protrusions 238, 242 to longitudinally interlock with one another, the mechanical interference at the joint between the bit body 44 and the extension 50 may carry at least a portion of any longitudinal load applied to the drill bit 230 during drilling operations. Furthermore, the angles 254, 256 may be configured such that a selected portion of any longitudinal load applied to the earth-boring rotary drill bit 230 during operation, may be apportioned between the mechanical interference at the joint and the weld 62 (and/or braze alloy 60).

The bit body 44 and the extension 50 of the earth-boring rotary drill bit 230 may be formed or otherwise provided in any number of different configurations that embody teachings of the present invention. For example, the bit body 44 and the extension 50 of the earth-boring rotary drill bit 230 may be formed or otherwise provided such that a transverse cross-sectional view of the earth-boring rotary drill bit 230, taken along section line D-D shown in FIG. 17, appears substantially similar to any one of FIGS. 5 and 6. In other words, the abutting surfaces 246, 248, 250, 252 forming the joint between the bit body 44 and the extension, may be configured to be concentric to the interface axis $A_I$ that is laterally offset or shifted from or relative to the longitudinal axis $L_{230}$ of the earth-boring rotary drill bit 230, in a manner similar to that shown in FIG. 5. As discussed above, by configuring the earth-boring rotary drill bit 230 with the channels 236, 240 and protrusions 238, 242 and by configuring the abutting surfaces 246, 248, 250, 252 of the joint to be concentric to the interface axis $A_I$ that is laterally offset or shifted from or relative to the longitudinal axis $L_{230}$, mechanical interference between the extension 50 and the bit body 44 at the joint may carry both longitudinal and torsional forces or loads applied to the drill bit during drilling operations and may prevent failure of the weld 62 (and/or braze alloy 60) due to such longitudinal and torsional forces.

Furthermore, the extension 50 of the earth-boring rotary drill bit 230 may comprise two or more separate portions 70, 72, which may be secured together around the male connection portion 192 of the bit body 44 as described above in relation to the two or more separate portions 70, 72 of the earth-boring rotary drill bit 42 shown in FIGS. 2-5.

Similar to the methods described above in relation to the orientation of the abutting surfaces of the channels and the protrusions of the earth-boring rotary drill bits 142, 182, 230 shown in FIGS. 13-17, the abutting surfaces 56, 58 of the earth-boring rotary drill bits 400, 500, 600, 700 shown in FIGS. 7-10 may be configured such that a portion of any longitudinal load applied to the earth-boring rotary drill bits 400, 500, 600, 700 may be selectively apportioned between mechanical interference at the joint between the extension 50 and the bit body 44 and the weld 62 (and/or braze alloy 60) using computation methods.

Figure 18:
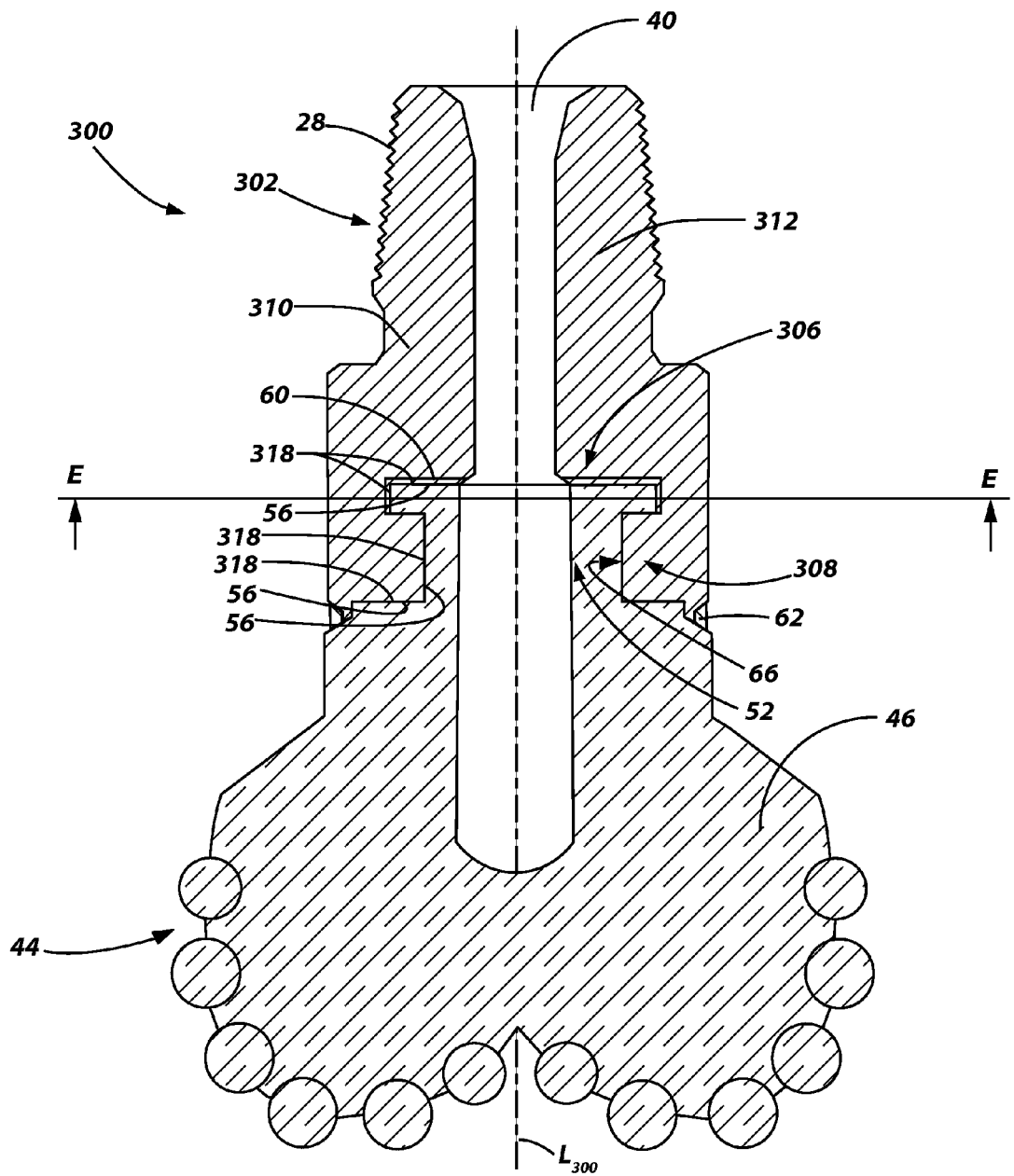
FIG. 18 is a longitudinal cross-sectional view of another embodiment of an earth-boring rotary drill bit of the present invention that includes a shank secured directly to a portion of a bit body of the drill bit.

While the embodiments of drill bits described hereinabove each include a shank assembly comprising a shank 48 secured to an extension 50, the present invention is not so limited. FIG. 18 is a longitudinal cross-sectional view of another embodiment of an earth-boring rotary drill bit 300 of the present invention. As shown therein, the shank assembly of the drill bit 300 comprises a shank 302 secured directly to the bit body 44 without using an extension therebetween. Like the previously described drill bits 42, 142, 182, 230, the earth-boring rotary drill bit 300 shown in FIG. 18 does not include a metal blank, such as the metal blank 16 of the drill bit 10 (FIG. 1). The shank 302 is secured directly to the particle-matrix composite material 46 of the bit body 44.

The earth-boring rotary drill bit 300 is similar to the drill bit 42 shown in FIG. 3 and retains the same reference numerals for similar features. However, as shown in FIG. 18 the earth-rotary drill bit 300 does not include an extension. The shank 302 includes a female connection portion 306 including a protrusion 308 (similar to the female connection portion and the protrusion described above in relation to the drill bit 42), which is secured directly to the male connection portion 52 and the channel 66 of the bit body 44. In this configuration, a mechanically interfering joint is provided between the shank 302 and the bit body 44 by the channel 66 and the complementary protrusion 308.

Additionally, as shown in FIG. 18, the one or more surfaces 56 of the bit body 44 configured to abut directly against one or more complementary surfaces 318 of the shank 302 may comprise any portion of the abutting surface 56. Thus, while in the embodiments discussed hereinabove the longitudinally uppermost surface 56 of the bit body has been configured to abut directly against a surface of the shank assembly without any braze alloy 60 disposed therebetween, the present invention is not so limited and any portion of the surface 56 may be configured to abut directly against the surfaces of the shank assembly.

The joint between the shank 302 and the bit body 44 may be configured such that mechanical interference between the shank 302 and the bit body 44 carries all or a selected portion of any longitudinal and torsional loads applied to the drill bit 300 during drilling operations. Thus, the channel 66 and the protrusion 308 may be configured to longitudinally interlock with one another, and the abutting surfaces 56, 318 may be concentric to (i.e., both approximately centered about) an interface axis $A_I$ that is not aligned with the longitudinal axis $L_{300}$ of the earth-boring rotary drill bit 300, in a manner similar to that described above in reference to the earth-boring rotary drill bit 42.

Additionally, the bit body 44 and the shank 302 of the earth-boring rotary drill bit 300 may be configured such that a transverse cross-sectional view of the earth-boring rotary drill bit 300 taken along section line E-E shown in FIG. 18 appears substantially similar to FIG. 5 or to FIG. 6.

The shank 302 may comprise two or more separate members 310, 312, which may be secured together around the male connection portion 52 of the bit body 44 in a manner similar to the two or more separate portions 70, 72 of the extension 50 described above in relation to the earth-boring rotary drill bit 42 shown in FIGS. 2-5. Furthermore, each interface between the two separate members 310, 312 of the extension 50 may comprise at least one longitudinally extending weld groove (not shown) similar to the weld groove 74 shown in FIG. 2. The two separate members 310, 312 of the shank 302 may be secured together, by way of example and not limitation, by at least one weld (not shown in FIG. 18) formed in the longitudinally extending weld groove. In other embodiments, the two or more separate members 310, 312 may be secured together by a braze alloy, a swage, or mechanical fastening means in addition to or in place of a weld.

The joints of the present invention and the methods used to form such joints may find particular utility with drill bits including new particle-matrix composite materials. New particle-matrix composite materials are currently being investigated in an effort to improve the performance and durability of earth-boring rotary drill bits. Examples of such new particle-matrix composite materials are disclosed in, for example, U.S. patent application Ser. No. 11/272,439, filed Nov. 10, 2005, now U.S. Pat. No. 7,776,256, issued Aug. 17, 2010, pending U.S. patent application Ser. No. 11/540,912, filed Sep. 29, 2006, and U.S. patent application Ser. No. 11/593,437, filed Nov. 6, 2006, now U.S. Pat. No. 7,784,567, issued Aug. 31, 2010.

Such new particle-matrix composite materials may include matrix materials that have a melting point relatively higher than the melting point of conventional matrix materials used in infiltration processes. By way of example and not limitation, nickel-based alloys, cobalt-based alloys, cobalt and nickel-based alloys, aluminum-based alloys, and titanium-based alloys are being considered for use as matrix materials in new particle-matrix composite materials. Such new matrix materials may have a melting point that is proximate to or higher than the melting points of metal alloys (e.g., steel alloys) conventionally used to form a metal blank, and/or they may be chemically incompatible with such metal alloys conventionally used to form a metal blank, such as the previously described metal blank 16 (FIG. 1).

Furthermore, bit bodies that comprise such new particle-matrix composite materials may be formed from methods other than the previously described infiltration processes. By way of example and not limitation, bit bodies that include such particle-matrix composite materials may be formed using powder compaction and sintering techniques. Examples of such techniques are disclosed in the above-mentioned U.S. patent application Ser. No. 11/272,439, filed Nov. 10, 2005, now U.S. Pat. No. 7,776,256, issued Aug. 17, 2010, and in U.S. patent application Ser. No. 11/271,153, also filed Nov. 10, 2005, now U.S. Pat. No. 7,802,495, issued Sep. 28, 2010. Such techniques may require sintering at temperatures proximate to or higher than the melting points of metal alloys (e.g., steel alloys) conventionally used to form a metal blank, such as the previously described metal blank 16 (FIG. 1).

In view of the above, it may be difficult or impossible to provide a metal blank in bit bodies formed from or comprising such new particle-matrix composite materials. As a result, it may be relatively difficult to attach a drill bit comprising a bit body formed from such new particle-matrix materials to a shank or other component of a drill string. Furthermore, because of the difference in melting temperatures and possible chemical incompatibility between a bit body formed from a new particle-matrix composite material and a shank formed from a metal alloy, welds used to secure the bit body to the shank may be difficult to form and may not exhibit the strength and durability of conventional welds. Therefore, the methods of the present invention including forming a joint between a bit body and a shank assembly that exhibits mechanical interference between the bit body and the shank for bearing at least a portion of longitudinal and/or torsional loads applied to the joint and methods of selectively apportioning any longitudinal loads applied to a shank assembly to mechanical interference between the bit body and the shank assembly may be particularly useful for forming joints between bit bodies formed from new particle-matrix composite materials and a shank formed from a metal.

While the channels and protrusions described hereinabove in the different embodiments have been shown in the figures as including relatively sharp corners and edges, in additional embodiments, the relatively sharp corners and edges may be replaced with rounded or smoothly curved corners and edges to minimize any concentration of stress that might occur at such sharp corners and edges during drilling operations. Additionally, the channels and protrusions and the male and female connection portions may comprise a wide variety of geometries and are shown herein as having particular geometries set forth herein as non-limiting examples to facilitate description of the present invention.

Additionally, while several embodiments of the invention have been illustrated as comprising bit bodies having one or more protrusions thereon and extension members and/or shanks having one or more recesses therein that are complementary to the protrusions and configured to receive the protrusions therein, in additional embodiments of the invention, such recesses may be provided in the bit bodies and the protrusions may be provided on the extensions and/or shanks.

While the present invention has been described herein with respect to certain preferred embodiments, those of ordinary skill in the art will recognize and appreciate that it is not so limited. Rather, many additions, deletions and modifications to the preferred embodiments may be made without departing from the scope of the invention as hereinafter claimed. In addition, features from one embodiment may be combined with features of another embodiment while still being encompassed within the scope of the invention as contemplated by the inventors.

What is claimed is:

1. An earth-boring rotary drill bit comprising:
a bit body having a connection portion attached to a shank assembly at a joint, the joint configured to carry a selected portion of any tensile longitudinal load applied to the drill bit by mechanical interference between abutting surfaces of the connection portion and the shank assembly at the joint,
wherein at least a portion of the abutting surfaces is oriented at an acute angle relative to a longitudinal axis of the earth-boring rotary drill bit, the acute angle being less than or equal to the arc-cotangent of a static coefficient of friction exhibited between the abutting surfaces.

2. The earth-boring rotary drill bit of claim 1, wherein the shank assembly comprises two or more separate members located at different radial positions around the joint, the two or more separate members being secured together around the joint.

3. The earth-boring rotary drill bit of claim 1, wherein the abutting surfaces are concentric to an interface axis offset from a longitudinal axis of the earth-boring rotary drill bit.

4. The earth-boring rotary drill bit of claim 1, wherein the bit body predominantly comprises a particle-matrix composite material, the particle-matrix composite material comprising a plurality of hard particles dispersed throughout a matrix material, the hard particles comprising a material selected from diamond, boron carbide, boron nitride, aluminum nitride, and carbides or borides of the group consisting of W, Ti, Mo, Nb, V, Hf, Zr, Si, Ta, and Cr, the matrix material selected from the group consisting of iron-based alloys, nickel-based alloys, cobalt-based alloys, titanium-based alloys, aluminum-based alloys, iron and nickel-based alloys, iron and cobalt-based alloys, and nickel and cobalt-based alloys.

5. The earth-boring rotary drill bit of claim 1, further comprising at least one of a weld and a brazing material at an interface between the abutting surfaces of the bit body and the shank assembly.

6. The earth-boring rotary drill bit of claim 1, wherein the abutting surfaces comprise at least one longitudinally interlocking channel and protrusion that extend circumferentially at least partially around a longitudinal axis of the earth-boring rotary drill bit.

7. The earth-boring rotary drill bit of claim 6, wherein the at least one channel extends radially inward toward the longitudinal axis of the earth-boring rotary drill bit a distance of at least five percent (5%) of a radius of the shank assembly.

8. A method of attaching a shank assembly to a bit body of an earth-boring rotary drill bit, the method comprising:
orienting at least one surface of a connection portion of a bit body at a first acute angle relative to a longitudinal axis of the bit body, the first acute angle being less than or equal to the arc-cotangent of a static coefficient of friction exhibited between the connection portion of the bit body and a connection portion of a shank;
orienting at least one surface of the connection portion of the shank at a second acute angle relative to the longitudinal axis of the bit body, the second acute angle being less than or equal to the arc-cotangent of a static coefficient of friction exhibited between the connection portion of the bit body and the connection portion of the shank;
bringing the at least one surface of the connection portion of the shank proximate the at least one surface of the connection portion of the bit body such that a void is defined therebetween;
providing an intermediate material in the void between the at least one surface of the connection portion of the shank and the at least one surface of the connection portion of the bit body to form a threadless joint and attach the bit body to the shank; and
configuring the threadless joint to carry at least a portion of any tensile longitudinal load applied to the drill bit and at least a portion of any rotational load applied to the drill bit by mechanical interference between the bit body and the shank at the joint.

9. The method of claim 8, wherein bringing the at least one surface of the connection portion of the shank proximate the at least one surface of the connection portion of the bit body such that a void is defined therebetween comprises assembling a shank assembly comprising at least two shank members at different radial positions around the connection portion of the bit body such that the connection portion of the bit body is disposed within the connection portion of the shank assembly.

10. The method of claim 8, wherein configuring the joint comprises causing the at least one surface of the connection portion of the shank and the at least one surface of the connection portion of the bit body to be concentric to an interface axis offset from a longitudinal axis of the earth-boring rotary drill bit.

11. The method of claim 8, wherein bringing the at least one surface of the connection portion of the shank proximate the at least one surface of the connection portion of the bit body comprises placing at least one surface of a female connection portion of the shank around at least one surface of a male connection portion of the bit body.

* * * * *